United States Patent
Watanabe et al.

(10) Patent No.: US 9,346,413 B2
(45) Date of Patent: May 24, 2016

(54) SADDLE-RIDE VEHICLE

(71) Applicant: HONDA MOTOR CO., LTD., Tokyo (JP)

(72) Inventors: Tsuguo Watanabe, Tokyo (JP); Kiyotaka Fujihara, Shiki (JP); Yasumasa Matsui, Tokyo (JP); Takuhei Kusano, Tsurugashima (JP); Daisuke Kuriki, Tokyo (JP); Kota Takizawa, Tokyo (JP); Daisuke Sekiya, Fujimi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/346,138

(22) PCT Filed: Feb. 26, 2013

(86) PCT No.: PCT/JP2013/055010
§ 371 (c)(1),
(2) Date: Jan. 16, 2015

(87) PCT Pub. No.: WO2013/129421
PCT Pub. Date: Sep. 6, 2013

(65) Prior Publication Data
US 2015/0158433 A1 Jun. 11, 2015

(30) Foreign Application Priority Data
Mar. 2, 2012 (JP) ................................. 2012-047114

(51) Int. Cl.
*B60R 11/02* (2006.01)
*B62J 11/00* (2006.01)
(Continued)

(52) U.S. Cl.
CPC ............. *B60R 11/0241* (2013.01); *B62J 11/00* (2013.01); *B62K 11/14* (2013.01); *B62K 19/32* (2013.01);
(Continued)

(58) Field of Classification Search
CPC ..... B60R 11/0241; B62J 11/00; B62K 11/14; B62K 19/32; B62K 21/02
USPC .......................................... 280/270; 180/219
See application file for complete search history.

(56) References Cited

U.S. PATENT DOCUMENTS 6,909,907 B1    6/2005  Oyang et al.
2002/0113185 A1  8/2002 Ziegler
(Continued)

FOREIGN PATENT DOCUMENTS

CN        102325689 A    1/2012
DE   10 2007 045 515 A1  4/2009
(Continued)

OTHER PUBLICATIONS

Office Action issued in corresponding China Appliction No. 201380002789.8 on Jun. 30, 2015 (with English language translation).
(Continued)

*Primary Examiner* — Kevin Hurley
*Assistant Examiner* — Marlon Arce
(74) *Attorney, Agent, or Firm* — Birch, Stewart, Kolasch & Birch, LLP

(57) ABSTRACT

The saddle-ride vehicle includes: a front fork that rotatably supports a front wheel; a steering shaft that is coupled to the front fork and is steerably supported by a vehicle body frame; a steering handlebar holder that includes a lower holder and an upper holder and is provided above the steering shaft, the upper holder being in contact with the lower holder from above and fastened to the lower holder; a portable terminal holder that is fastened to the upper holder or the lower holder and capable of holding a personal digital assistance; and a steering system in which a steering handlebar pipe sandwiched between the lower holder and the upper holder is fixed to the steering handlebar holder.

14 Claims, 28 Drawing Sheets

(51) Int. Cl.
  *B62K 19/32* (2006.01)
  *B62K 11/14* (2006.01)
  *B62K 21/02* (2006.01)
  *B62J 99/00* (2009.01)
  *B60R 11/00* (2006.01)

(52) U.S. Cl.
  CPC ......... *B62K 21/02* (2013.01); *B60R 2011/0001* (2013.01); *B60R 2011/0007* (2013.01); *B62J 2099/0026* (2013.01); *B62J 2099/0033* (2013.01); *B62J 2300/0033* (2013.01)

(56) References Cited

U.S. PATENT DOCUMENTS

| | | | |
|---|---|---|---|
| 2004/0220708 A1 | 11/2004 | Owen et al. | |
| 2005/0121483 A1 | 6/2005 | Barnes | |
| 2008/0246247 A1* | 10/2008 | Hoshi | B62J 11/00 280/280 |
| 2008/0284129 A1* | 11/2008 | McVickar | B62K 11/14 280/288.4 |
| 2011/0239814 A1* | 10/2011 | Athanasiou | B62K 11/14 74/551.2 |
| 2011/0246024 A1* | 10/2011 | Hattori | B62J 99/00 701/36 |
| 2014/0225349 A1* | 8/2014 | Kondrat | B62J 11/00 280/288.4 |

FOREIGN PATENT DOCUMENTS

| | | |
|---|---|---|
| EP | 1 081 035 A2 | 3/2001 |
| EP | 1 977 963 A1 | 10/2008 |
| JP | 62-188895 U | 12/1987 |
| JP | 63-39097 U | 3/1988 |
| JP | 9-156560 A | 6/1997 |
| JP | 11-157475 A | 6/1999 |
| JP | 2001-071967 A | 3/2001 |
| JP | 2001-352209 A | 12/2001 |
| JP | 2003-137161 A | 5/2003 |
| JP | 2004-200986 A | 7/2004 |
| JP | 2004-237762 A | 8/2004 |
| JP | 2005-035438 A | 2/2005 |
| JP | 2005-104258 A | 4/2005 |
| JP | 2006-254646 A | 9/2006 |
| JP | 2007-112316 A | 5/2007 |
| JP | 2007-276635 A | 10/2007 |
| JP | 2008-254649 A | 10/2008 |
| JP | 2011-093445 A | 5/2011 |
| JP | 4812909 B1 | 9/2011 |
| KR | 2012-0010503 A | 2/2012 |
| WO | WO 2009/043367 A1 | 4/2009 |
| WO | WO 2012/101675 A1 | 8/2012 |

OTHER PUBLICATIONS

Search Report dated Jul. 2, 2014 issued in EP Application No. 14157252.9.
Search Report dated Jul. 2, 2014 issued in EP Appliction No. 13755409.3.
Search Report dated May 12, 2014 issued in EP Application No. 14157263.6.
Search Report dated May 2, 2014 issued in EP Application No. 14157244.6.
International Search Report for PCT/JP2013/055010 mailed on May 28, 2013.
Written Opinion of the International Search Report for PCT/JP2013/055010 mailed on May 28, 2013.
"BioLogic Bike Mount for iPhone 3GS/3G" (online) Dec. 21, 2010, Pleiades System Designs, Inc., [Retrieval date Jan. 7, 2015] Internet: [URL:http://www.pleiadesigns.co.jp/jp/catalog/biologic/biologicbike3gs.html].
Office Action dated Jan. 20, 2015 issued in corresponding JP Application No. 2014-037532 (with English language translation).
Office Action dated Jan. 20, 2015 issued in corresponding JP Application No. 2014-037533 (with English language translation).
Office Action dated Jan. 20, 2015 issued in corresponding JP Application No. 2014-037535 (with English language translation).
Notice of Allowance dated Sep. 15, 2015 issued in related Japanese Application No. 2014-037535 (with English translation).
RR9803 Gadget P.A.S. Case, Rough & Road Sports Co., Ltd. (http"//rough*and*road.weblogs.jp/news/2010/09/rr9803.html.

* cited by examiner

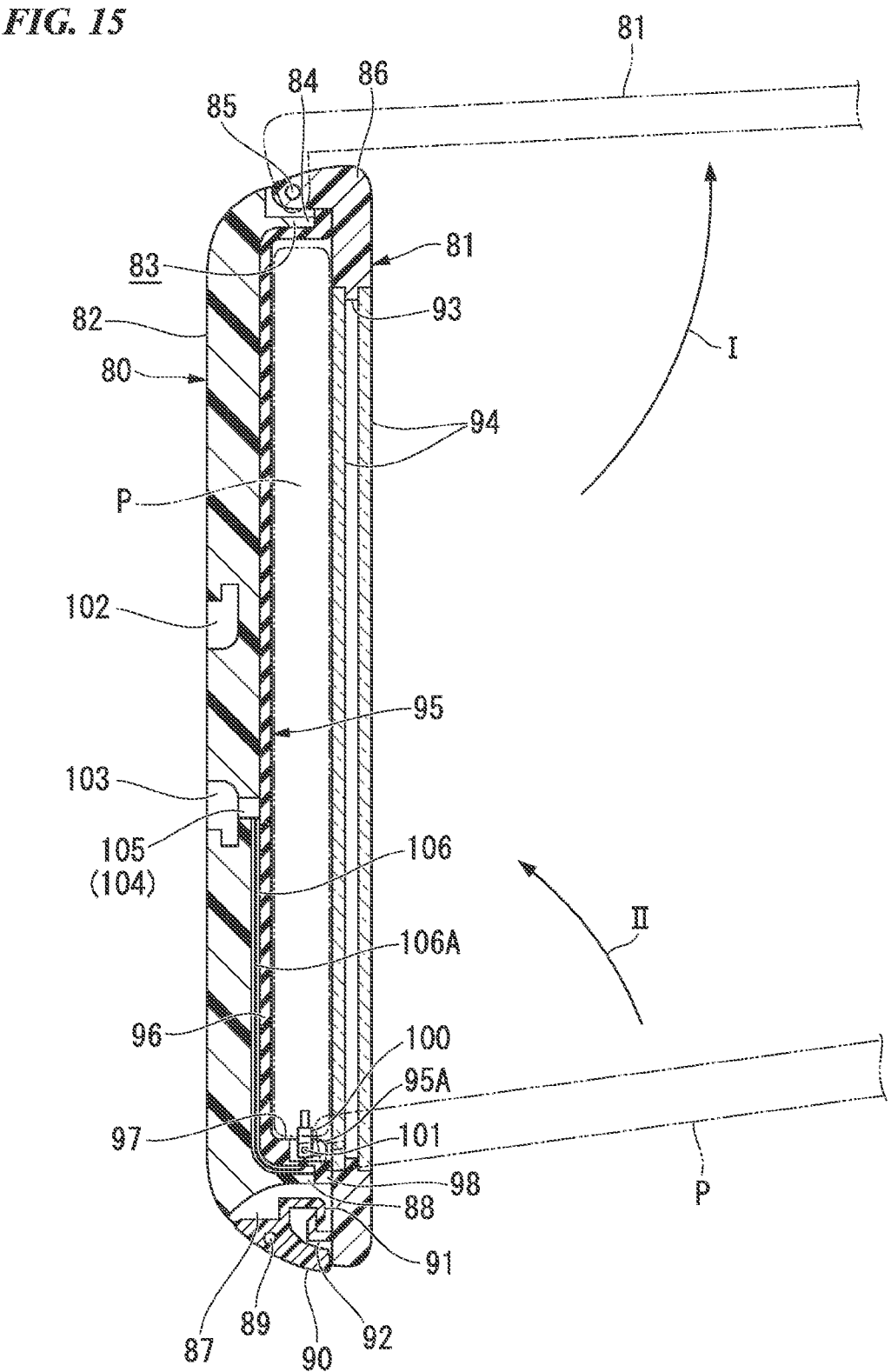

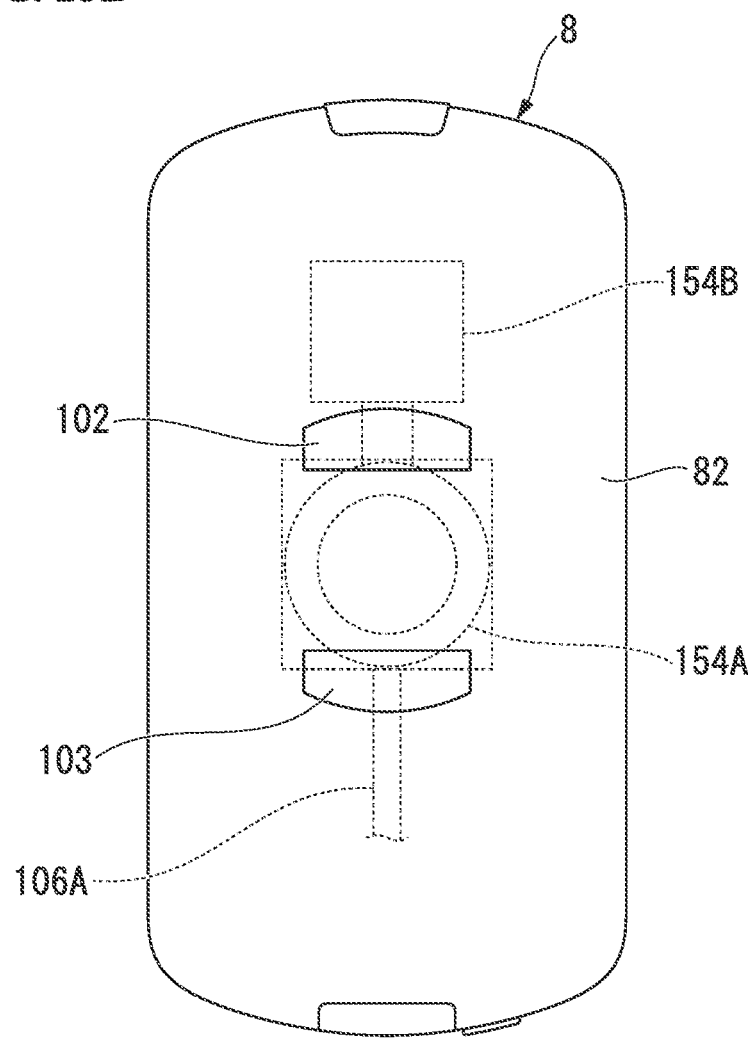

SADDLE-RIDE VEHICLE

CROSS-REFERENCE TO RELATED APPLICATIONS

This is the U.S. National Phase Application under 35 U.S.C. §371 of International Patent Application No. PCT/JP2013/055010 filed on Feb. 26, 2013, which designated the United States and was published in a language other than English, which claims the benefit of Japanese Patent Application No. 2012-047114 filed on Mar. 2, 2012, both applications are incorporated by reference herein. The International Application was published in Japanese on Sep. 6, 2013 as WO2013/129421 A1 under PCT Article 21(2).

BACKGROUND OF THE INVENTION

The present invention relates to a saddle-ride vehicle.

DESCRIPTION OF THE RELATED ART

A bike including a portable telephone holder that is attached to a right portion of a steering handlebar pipe thereof is disclosed in Japanese Unexamined Patent Application, First Publication No. 2005-104258.

However, in the configuration of the above-mentioned Japanese Unexamined Patent Application, First Publication No. 2005-104258, the aforementioned holder is attached so as to be shifted (offset) to the right side from the steering axis line of a steering shaft; therefore, since the holder significantly swings due to rotation of the steering handlebar pipe, stability of holding the portable telephone is susceptible to improvement in many ways.

SUMMARY OF THE INVENTION

The invention was made in view of the above-described situation, and has an object to provide a saddle-ride vehicle which can hold a personal digital assistance such as a portable telephone in a stable state.

A saddle-ride vehicle of one aspect of the invention includes: a front fork that rotatably supports a front wheel; a steering shaft that is coupled to the front fork and is steerably supported by a vehicle body frame; a steering handlebar holder that includes a lower holder and an upper holder and is provided above the steering shaft, the upper holder being in contact with the lower holder from above and fastened to the lower holder; a portable terminal holder that is fastened to the upper holder or the lower holder and capable of holding a personal digital assistance; and a steering system in which a steering handlebar pipe sandwiched between the lower holder and the upper holder is fixed to the steering handlebar holder.

In the saddle-ride vehicle of one aspect of the invention, it is preferable that the portable terminal holder be fastened to the lower holder and the upper holder, and the upper holder and the portable terminal holder be tightened together to the lower holder.

In the saddle-ride vehicle of one aspect of the invention, it is preferable that the portable terminal holder hold the personal digital assistance so that the personal digital assistance is located on an extension line of a steering axis line of the steering shaft.

It is preferable that the saddle-ride vehicle of one aspect of the invention further include an instrument panel disposed in front of the steering handlebar pipe, wherein the personal digital assistance is held by the portable terminal holder; in a case where a driver seated on a seat looks at the instrument panel along a line of sight in which the driver looks at an upper end of the personal digital assistance, the portable terminal holder holds the personal digital assistance so that a substantially lower edge of the instrument panel is located in the line of sight.

In the saddle-ride vehicle of one aspect of the invention, it is preferable that, in a case where the personal digital assistance is held by the portable terminal holder, where an angle between a line of sight when the driver looks at an upper end of the instrument panel and a line of sight when the driver looks at the upper end of the personal digital assistance is represented as a first view angle ($θ1$); and an angle between the line of sight when the driver looks at the upper end of the personal digital assistance and a line of sight when the driver looks at a lower end of the personal digital assistance is represented as a second view angle ($θ2$), the relationship of the first view angle ($θ1$)+the second view angle ($θ2$)<90 degrees be established; where an angle between a straight line that extends forward and upward in a direction parallel to a surface of a display unit of the instrument panel and the line of sight when the driver looks at an upper end of the instrument panel is represented as a first eye point angle; and an angle between a straight line that extends forward and upward in a direction parallel to a surface of the personal digital assistance and the line of sight when the driver looks at the upper end of the personal digital assistance is represented as a second eye point angle ($θβ$), the relationship of 90 degrees≤the first eye point angle ($θα$)≤180 degrees and the relationship of 90 degrees≤the second eye point angle ($θβ$)≤180 degrees be established.

In the saddle-ride vehicle of one aspect of the invention, it is preferable that, where an angle between a horizontal line of sight when the driver looks forward and upward along a horizontal direction parallel to a ground surface and a straight line that extends forward and upward in a direction parallel to a surface of a display unit of the instrument panel is represented as a panel inclination angle ($θα'$); an angle between the horizontal line of sight when the driver looks forward and upward along the horizontal direction parallel to the ground surface and a straight line that extends forward and upward in a direction parallel to a surface of the personal digital assistance is represented as a terminal inclination angle ($θβ'$), the relationship of the panel inclination angle ($θα'$)>the terminal inclination angle ($θβ'$) be established.

In the saddle-ride vehicle of one aspect of the invention, it is preferable that the portable terminal holder be placed above the upper holder and be configured to include: a base that is fastened to the lower holder; and a locking portion that protrudes from the base and holds the personal digital assistance, and that the upper holder be covered with the base.

In the saddle-ride vehicle of one aspect of the invention, it is preferable that the base be formed in a downward-and-backward inclined shape.

In the saddle-ride vehicle of one aspect of the invention, it is preferable that the portable terminal holder include a shaft portion parallel to an extension direction of the steering handlebar pipe that is sandwiched by the steering handlebar holder and be capable of allowing the locking portion to rotate around the shaft portion, and the shaft portion be placed behind the steering handlebar pipe.

Effects of the Invention

According to the saddle-ride vehicle of one aspect of the invention, the portable terminal holder is provided at the steering handlebar holder that is located above the steering shaft and on the steering axis line.

Consequently, since the swing of the portable terminal holder is reduced due to rotation of the steering handlebar pipe as compared with the case of the position that is displaced from the steering axis line (offset position), it is possible to hold the personal digital assistance in the portable terminal holder in a stable state.

According to the saddle-ride vehicle of one aspect of the invention, in the case where the portable terminal holder is fastened to the upper holder and the lower holder in the steering handlebar holder, it is possible to reduce the number of components related to provision of a holder.

According to the saddle-ride vehicle of one aspect of the invention, it is possible to ensure a high level of visibility of the instrument panel and the personal digital assistance.

According to the saddle-ride vehicle of one aspect of the invention, in the case where the relationship of the first view angle ($\theta 1$)+the second view angle ($\theta 2$)<90 degrees is established, since the driver's viewing field region that straddles the instrument panel and the personal digital assistance is focused, it is possible to ensure excellent visibility for the driver.

Additionally, in the case where a person generally looks down at a visible target object, the person has a tendency to spontaneously look at the visible target object at a conspicuous location such that an angle between the line of sight and the visible target object is 90 degrees or more.

Because of this, in the case where the relationship of 90 degrees≤the first eye point angle ($\theta\alpha$)≤180 degrees and 90 degrees≤the second eye point angle ($\theta\beta$)≤180 degrees is established, since angles of the line of sight with respect to the instrument panel and the personal digital assistance are 90 degrees or more at all positions, it is easy to see them, and visibility is ensured.

According to the saddle-ride vehicle of one aspect of the invention, since the personal digital assistance that is located in front as seen from the driver inclines to the front greater than the instrument panel with respect to the vertical direction, particularly, visibility of personal digital assistance is ensured.

According to the saddle-ride vehicle of one aspect of the invention, it is possible to obtain protection performance of the upper holder and the appearance of an excellent vehicle overall.

According to the saddle-ride vehicle of one aspect of the invention, it is easy to arrange the personal digital assistance at the position which is easy to see from the driver and an excellent appearance is obtained.

According to the saddle-ride vehicle of one aspect of the invention, since the shaft portion that allows the locking portion of the personal digital assistance of the portable terminal holder to rotate is positioned behind the steering handlebar pipe, protrusion of the portable terminal holder in the vertical direction which is due to provision of the shaft portion is reduced, and it is possible to rotate the locking portion in a compact situation.

BRIEF DESCRIPTION OF THE DRAWINGS

FIG. 15 is a cross-sectional view taken along the line Y-Y of FIG. 14A.

FIG. 23B is a back view showing the personal digital assistance case in which configuration of a coil and a substrate is changed in the modified example 5 of the invention.

DETAILED DESCRIPTION OF THE INVENTION

Hereinafter, an embodiment of the invention will be described with reference to drawings.

Particularly, in drawings used in the following explanation, Arrow FR indicates the vehicle forward, Arrow UP indicates the upside of the vehicle, and Arrow LH indicates the left of the vehicle.

Figure 1:
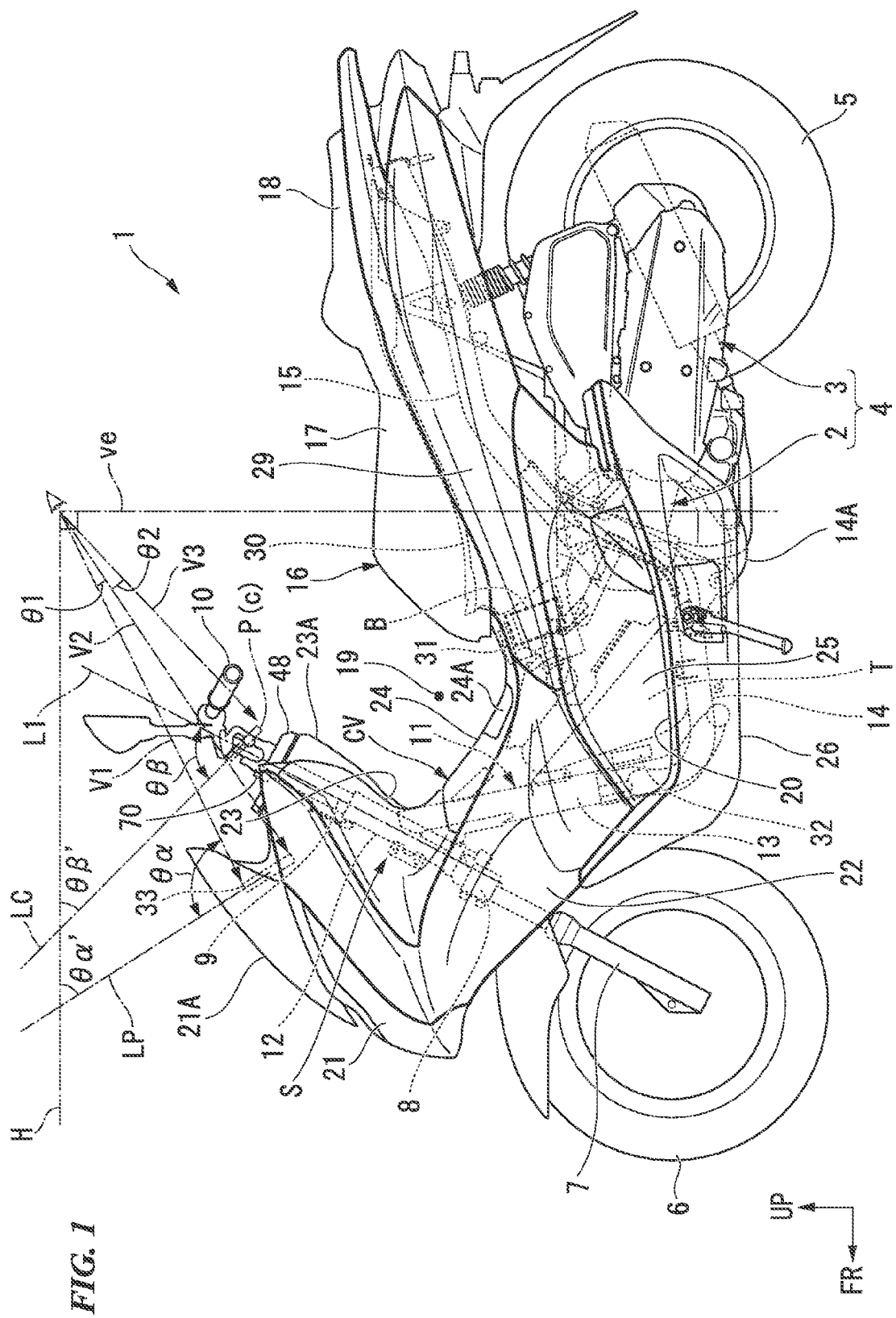
FIG. 1 is a left side view showing a motorcycle related to the embodiment of the invention.

FIG. 1 shows a motor-scooter type motorcycle 1 to which the embodiment of the invention is applied.

The motorcycle 1 is provided with a swing unit 4 that integrally includes an engine 2 and a power transmission mechanism 3, rotatably supports a rear wheel 5 behind the swing unit 4, and disposes a front wheel 6 constituting a steering system S in front of the swing unit 4.

The front wheel 6 is rotatably supported by a pair of right and left front forks 7 at the lower portion thereof, a fork bridge 8 is disposed at upper portions of the right and left front forks 7, and a steering shaft 9 serving as a steering shaft is provided upright at the center of the fork bridge 8 in the vehicle width direction.

A steering handlebar pipe 10 is provided above the steering shaft 9, and the steering handlebar pipe 10 is constituted of a single pipe member that extends in the vehicle width direction.

The steering system S of the embodiment is mainly constituted of the front wheel 6, the front fork 7, the steering shaft 9, and the steering handlebar pipe 10, or the like.

Here, L1 shown in drawings represents the steering axis line of the steering system S.

The steering shaft 9 is rotatably supported by a head pipe 12 that is provided at a front end of a vehicle body frame 11 including a plurality of frame members that are integrated by welding or the like.

The vehicle body frame 11 of the vehicle is connected to the above-described head pipe 12, a main frame 13 extending downward from the head pipe 12, and a bottom side surface of the main frame 13.

The vehicle body frame 11 of the vehicle extends rearward and is connected to a pair of right and left side frames 14 that extends upward and rearward and an upper end of the side frames 14.

The vehicle body frame 11 of the vehicle is provided with a pair of right and left seat frames 15 that extends upward and rearward.

Particularly, in a precise sense, the main frame 13 is slightly inclined with respect to the vertical direction and extends rearward and downward from the head pipe 12.

The swing unit 4 is supported by rear bottoms of the side frames 14 via a linking member 14A and is capable of swinging in the vertical direction.

A seat 16 on which occupants is to be seated is positioned above the swing unit 4.

The seat 16 extends in the front-back direction and integrally forms a main seat 17 on which the driver is to be seated and a pillion seat 18 on which a passenger is to be seated.

The motorcycle 1 is covered with a vehicle body cover CV that is configured by a plurality of cover members made of resin materials, and a front cover 21 is positioned above the front wheel 6 and in front of the head pipe 12.

Additionally, a pair of right and left front side covers 22, which are formed in a L-shaped and have corner portions provided forward in a side view, are continuously arranged at back ends of both sides of the front cover 21.

The front side covers 22 are formed in a shape in which one side of the L-shaped configuration thereof is continuously arranged at the back end of the both side of the front cover 21 and the other side of the L-shaped configuration extends rearward.

The front cover 21 is formed in a streamlined shape such that the width thereof is gradually reduced in the direction toward the front of the vehicle when seen in a top view; and at the upper portion thereof, a cutout having the width, that is gradually reduced along the center line in the vehicle width direction in the direction from the back to the front, is formed.

A screen 21A is provided inside the cutout.

The screen 21A is fixed to an edge or the like of the above-mentioned cutout of the front cover 21 and stands up in the upper rear direction and in the direction from the front to the back when seen in a side view.

The screen 21A is configured so that a headwind hitting the screen 21A flows from the front of the vehicle to upper rear.

Additionally, the front cover 21 integrally includes a front light and right and left direction indicators.

The space between the right and left rear portions of the front side covers 22 is covered with an upper inner cover 23 and a lower inner cover 24 that extend in the vehicle width direction.

A back wall portion of the upper inner cover 23 extends in the vertical direction along the steering shaft 9; and a lower end of the back wall portion is located behind a lower end of the head pipe 12.

In contrast, the lower inner cover 24 extends rearward so as to be continuously arranged at a lower end of the above-described back wall portion of the upper inner cover 23; and the rear end of the lower inner cover 24 reaches the position that is adjacently in front of the front end of the seat 16.

A bulging portion 23A that bulges rearward is formed at the center region in the vehicle width direction and is provided above the back wall portion of the upper inner cover 23; and the bulging portion 23A is formed in an arc shape that is along the outer peripheral face of the steering shaft 9 at the radial-outer direction of the steering shaft 9.

Furthermore, a fuel tank T is disposed under the lower inner cover 24, and a fill opening lid 24A, that is used to expose a fill opening of the fuel tank T which is not shown in the figure to the outside thereof, is provided at the lower inner cover 24 so as to be able to open and close.

Here, a foot-through space 19 through which occupant's foot passes during getting on and out is formed in front of the seat 16 and above the lower inner cover 24.

The driver passes their foot through the foot-through space 19, is seated on the seat 16, puts their foots on right and left step floors 20 that are provided at a lower center portion in the vehicle body front-back direction, and is thereby seated on the motorcycle 1.

Here, the aforementioned step floors 20 are provided integrally with a pair of right and left lower covers 25 that are continuously arranged at the lower portion of the front side covers 22 and extend rearward, and the lower covers 25 extend to above the swing unit 4.

Additionally, a pair of right and left under cowls 26 is provided under the lower covers 25.

Spaces between the lower covers 25 and the seat 16 are covered with paired right and left rear side covers 29, each of which has a front end that is continuously arranged at the rear end of the front side cover 22 and extends rearward.

A storage box 30 is provided between the right and left rear side covers 29 and under the seat 16, and the seat 16 is supported by the storage box 30.

The seat 16 can open and close the storage box 30 from the rear thereof and with the front end thereof serving as an axis.

Moreover, a battery storage portion 31 is provided at a front end portion of the storage box 30, and a battery B is accommodated in the battery storage portion 31.

Furthermore, an engine control unit (hereinbelow, referred to as an ECU) 32 is provided under and behind the main frame 13.

the ECU 32 acquires information from various sensors or the like which are mounted on the vehicle and is a control unit that controls, for example, the amount of fuel consumption of the engine.

Figure 2:
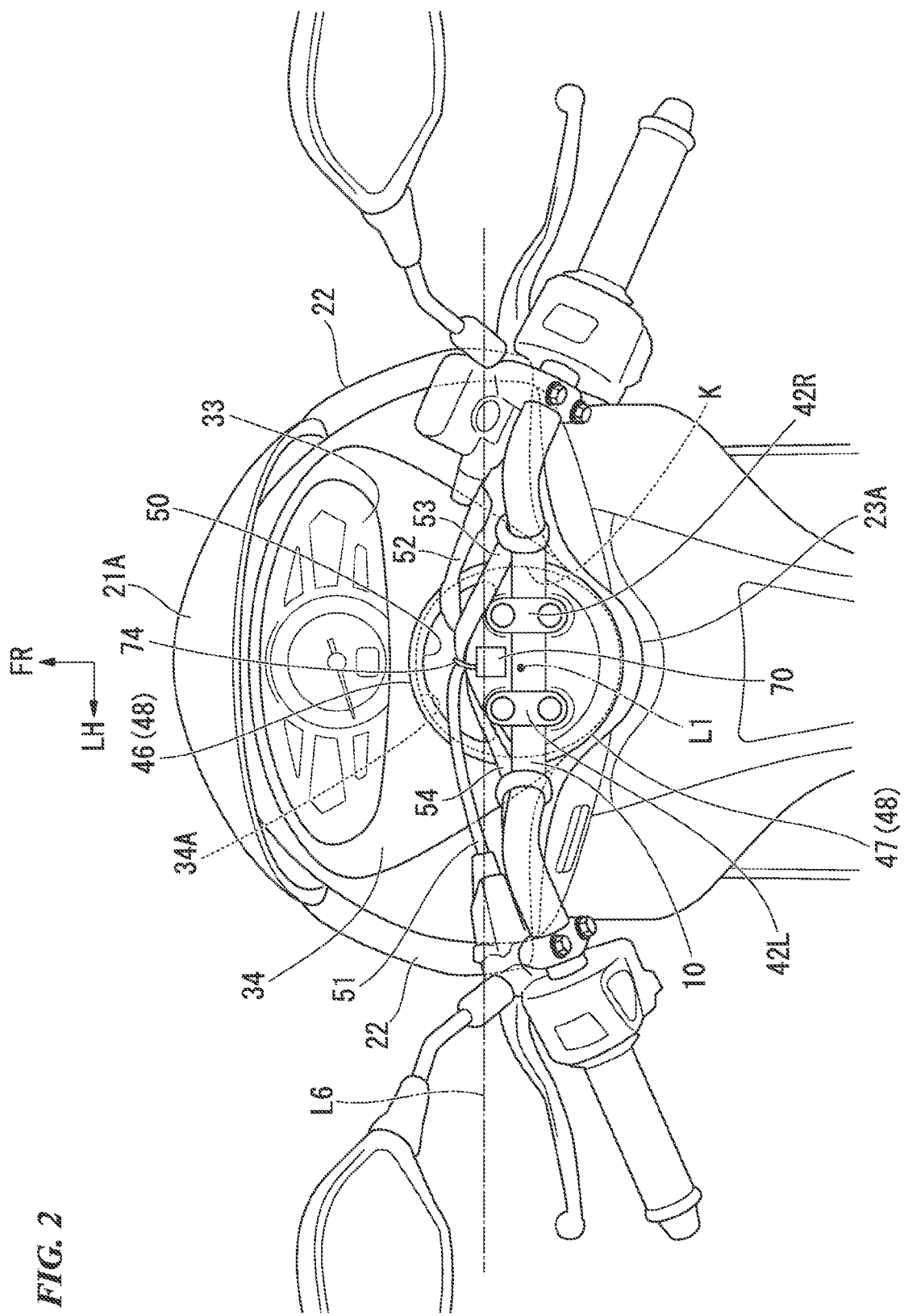
FIG. 2 is an overhead view showing the periphery of a steering handlebar pipe of the motorcycle related to the embodiment of the invention when viewed diagonally forward and downward from above the vehicle.

Next, FIG. 2 is a top view showing the periphery of the steering handlebar pipe 10 and shows an instrument panel 33 that is disposed between the steering handlebar pipe 10 and the screen 21A and provided with indicators such as a speedometer.

The instrument panel 33 is supported by a front inner panel 34 so that the display surface thereof is made exposed through an opening formed at the plate-shaped front inner panel 34 that covers the space surrounded by the upper portions of the right and left front side covers 22 and the screen 21A.

Here, a cutout portion 34A that is recessed to be directed forward is formed at the center region in the vehicle width direction and is provided behind the front inner panel 34; and the cutout portion 34A is formed in an arc shape that is along the outer peripheral face of the steering shaft 9 at the radial-outer direction of the steering shaft 9.

The right and left ends of the cutout portion 34A are in contact with the right and left ends of the bulging portion 23A of the above-mentioned upper inner cover 23, and a circular space K is formed by the cutout portion 34A and the bulging portion 23A.

Here, with reference to FIG. 1, an upper end portion of the steering shaft 9 protrudes upward from the space K, and the steering handlebar pipe 10 is fixed to the steering shaft 9 above the space K.

Figure 3:
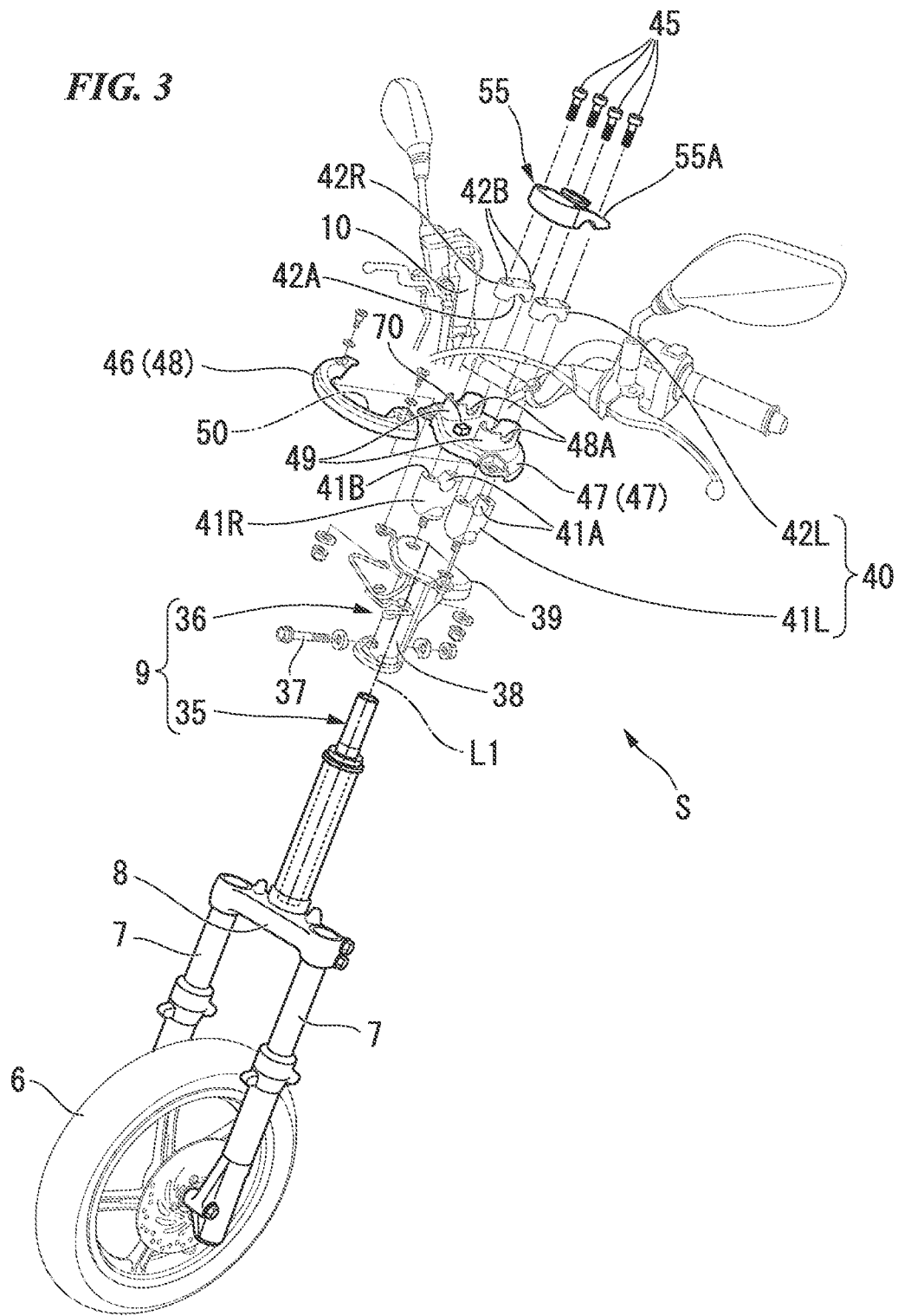
FIG. 3 is an exploded perspective view showing a steering system of the motorcycle related to the embodiment of the invention.

FIG. 3 is an exploded perspective view showing the steering system S.

In the embodiment, the steering shaft 9 is provided with: a shaft body 35 that is inserted into the head pipe 12 and rotatably supported thereby; and a steering handle stem 36 that is coupled to an upper portion of the shaft body 35 protruding upward from the head pipe 12 in the shaft body 35.

The steering handle stem 36 is provided with: a cylinder portion 38 into which the upper portion of the shaft body 35 is inserted and which is non-rotatably coupled thereto by use of a bolt 37; and a rectangular stay portion 39 that is coupled to the cylinder portion 38 so at to occlude the upper end thereof and that extends toward both sides in the vehicle width direction.

The steering handlebar pipe 10 is fastened to a steering handlebar holder 40 that is fixed to the stay portion 39.

In the embodiment, the steering handlebar holder 40 is provided with: a pair of right and left lower holders 41L and 41R; and a pair of right and left upper holders 42L and 42R.

The lower holders 41L and 41R are fixed to a top surface of the stay portion 39 and protrude upward therefrom.

The upper holders 42L and 42R are in contact with the upper portions of the lower holders 41L and 41R.

The steering handlebar pipe 10 is sandwiched between the lower holders 41L and 41R and the upper holders 42L and 42R.

The lower holders 41L and 41R and the upper holders 42L and 42R are divisionally arranged at right and left of the stay portion 39 so as to sandwich the steering axis line L1.

Arc shaped steering handlebar receiving portions 41A that are recessed downward and used to mount the steering handlebar pipe 10 thereon are formed at the upper portions of the lower holders 41L and 41R, respectively.

Bolt fastener holes 41B are formed at both sides of the lower holders 41L and 41R so as to hold the steering handlebar receiving portions 41A.

In contrast, arc shaped steering handlebar contact portions 42A that are recessed upward and used to press the steering handlebar pipe 10 thereto are formed at the lower portions of the upper holders 42L and 42R, respectively.

Through holes 42B that correspond to the bolt fastener holes 41B are formed at both the upper holders 42L and 42R so as to sandwich the steering handlebar contact portions 42A.

Bolts 45 that are fastened to the bolt fastener holes 41B are inserted into the through holes 42B of the upper holder 42.

As a result of fastening the bolts 45 that are inserted into the aforementioned through holes 42B, respectively, to the bolt fastener holes 41B in a state where the above-described steering handlebar contact portions 42A are in contact with the steering handlebar pipe 10, the steering handlebar pipe 10 is fixed to the lower holders 41L and 41R and the upper holders 42L and 42R.

Here, in the embodiment, a disk-shaped steering handlebar cover 48 in which a front-half portion 46 is coupled to a rear-half portion 47 is fixed to the stay portion 39 of the steering handle stem 36, and the steering handlebar cover 48 covers the top surface of the stay portion 39 from above with reference to FIG. 2.

The rear-half portion 47 is formed in a semicircular shape in a top view and is fitted onto the stay portion 39 from above.

Right and left through holes 48A into which the right and left lower holders 41L and 41R are inserted are formed on the rear-half portion 47, and peripheral wall portions 49 that cover the circumferences of the lower holders 41L and 41R, respectively, are formed at outer circumferential edges of the through holes 48A.

Additionally, a cutout that is used to avoid interference of the steering handlebar pipe 10 is formed at the peripheral wall portions 49.

When the rear-half portion 47 is fitted onto the stay portion 39, the lower holders 41L and 41R pass through the through holes 48A, and the upper portions thereof are made exposed to the outside thereof through the upper end openings of the peripheral wall portions 49.

On the other hand, the front-half portion 46 is formed in an arc shape, the both end portions thereof are fastened to the right and left ends of the rear-half portion 47.

In a state where the front-half portion 46 is coupled to the rear-half portion 47, as shown in FIG. 2, the front-half portion 46 and the rear-half portion 47 form a circle in outer shape, a space is provided between the back end of the front-half portion 46 and the front end of the rear-half portion 47, and this space functions as a cable routing hole 50 through which various cables are inserted and pass.

Here, the front end of the rear-half portion 47 protrudes forward and is in an arc shape.

Both end portions of the front-half portion 46 are coupled to both sides of the rear-half portion 47 so as to sandwich the arc shaped protruded portion of the rear-half portion 47, and the cable routing hole 50 is formed in an arc shape (crescent shape).

In addition, for convenience in explanation in FIG. 3, the cable routing hole 50 is represented by dashed-two dotted line.

Furthermore, two members of the front-half portion 46 and the rear-half portion 47 constitute the steering handlebar cover 48 in the embodiment; and alternatively a constitution, in which the above-mentioned cable routing hole 50 is provided on a circular steering handlebar cover 48 formed of single member, may be adopted.

Returning to FIG. 2, the above-mentioned steering handlebar cover 48 is disposed close to the edges of the cutout portion 34A and the bulging portion 23A in the vertical direction and above the circular space K that is formed of the cutout portion 34A and the bulging portion 23A.

The steering handlebar cover 48 covers the lower position of the steering handlebar holder 40 in the steering system S from above.

Moreover, as shown in FIG. 2, various cables such as front and back brake cables 51 and 52, a throttle cable 53, and a handlebar switch cable 54 pass through the cable routing hole 50 of the steering handlebar cover 48, and a plurality of cables are integrated.

Particularly, the handlebar switch cable 54 is a cable used to output a signal from a switch box provided at the steering handlebar pipe 10 to the ECU 32 or the like.

Additionally, the front and back brake cables 51 and 52 or the like pass through the front of the steering shaft 9 and are led to suitable portions of the vehicle.

Figure 4:
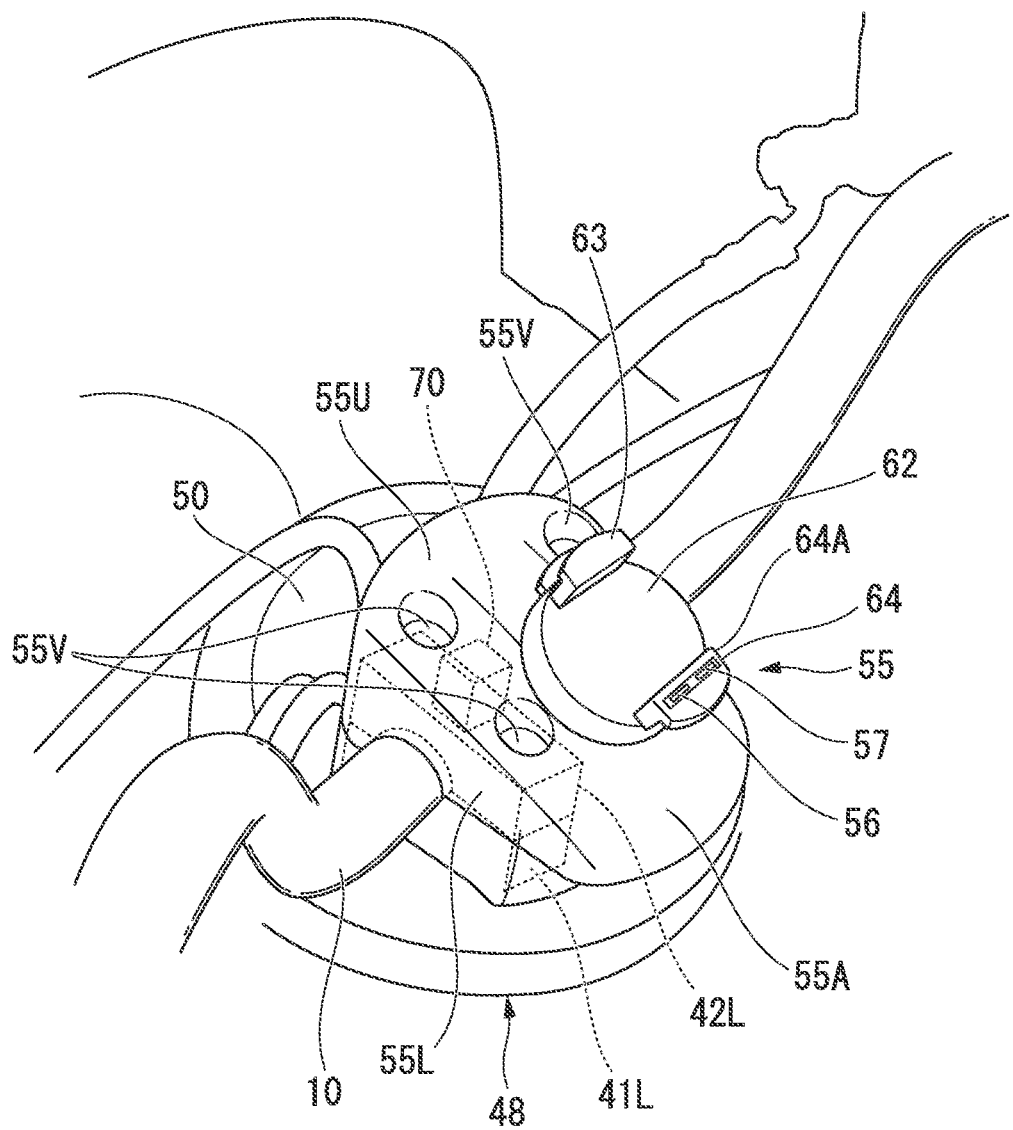
FIG. 4 is a perspective view showing a portable terminal holder of the motorcycle related to the embodiment of the invention.
Figure 5:
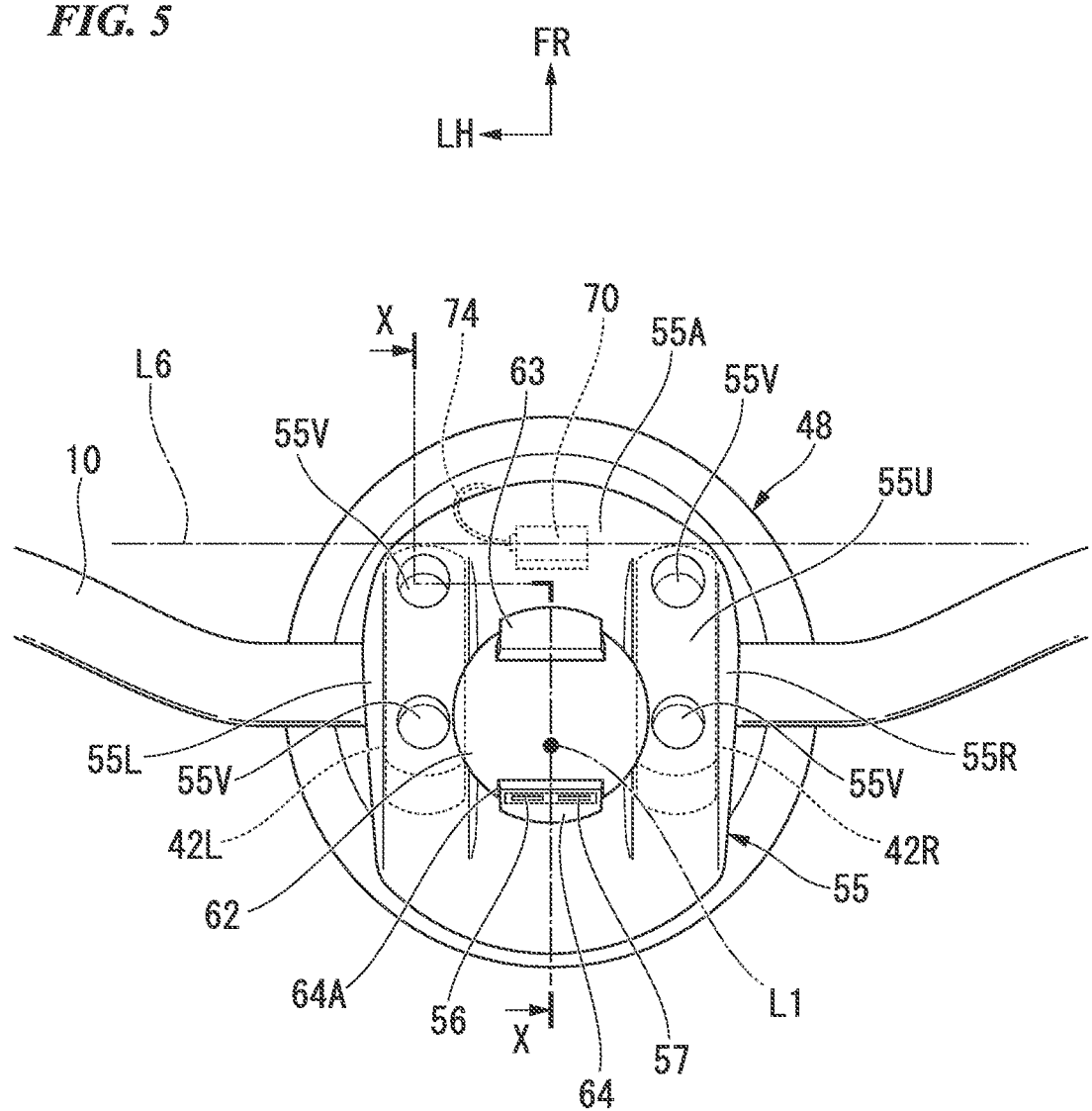
FIG. 5 a view showing the portable terminal holder of the motorcycle related to the embodiment of the invention when viewed from above.
Figure 6:
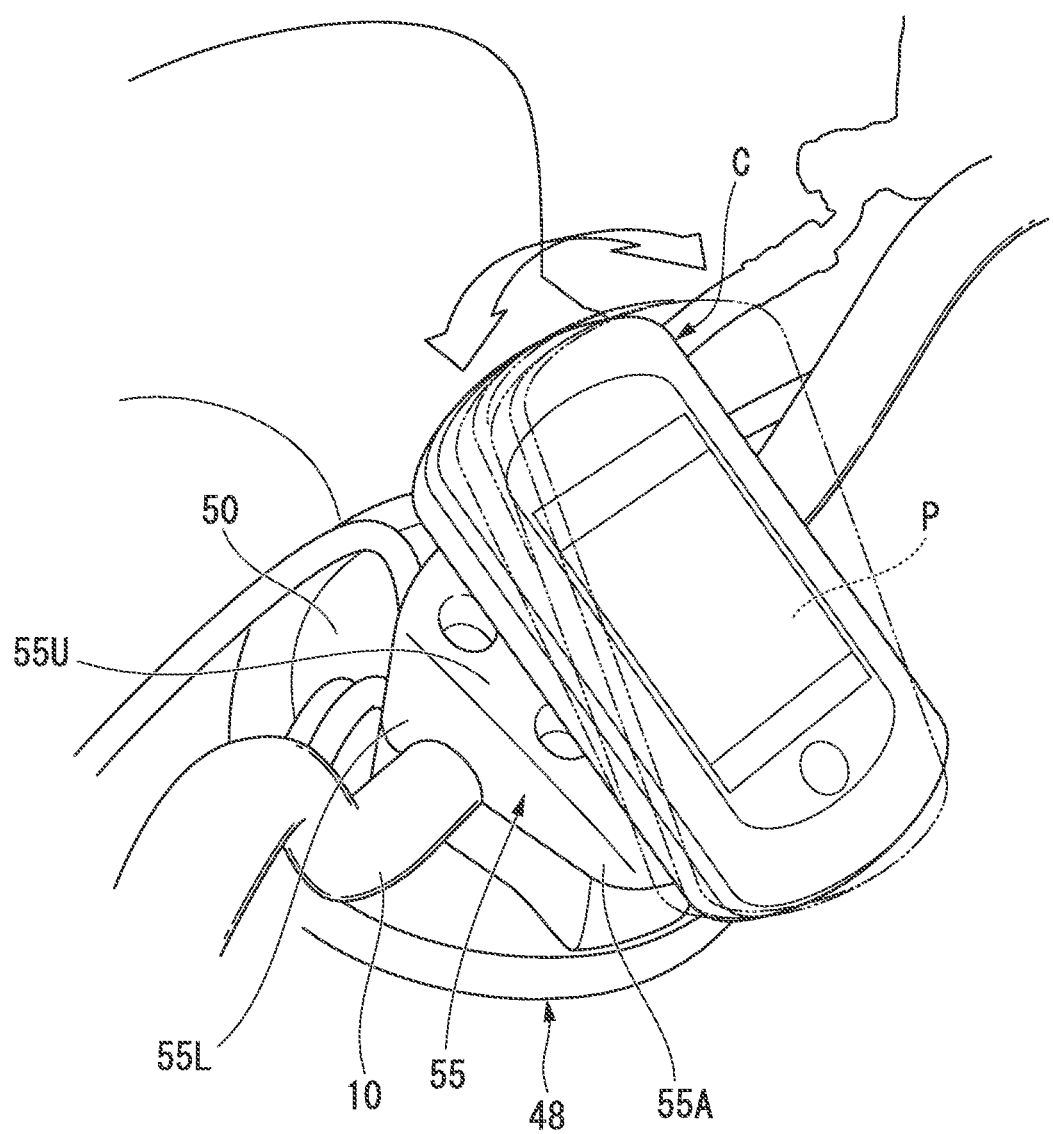
FIG. 6 is a perspective view showing a state where a personal digital assistance is attached to the portable terminal holder related to the embodiment of the invention.

With reference to FIGS. 2 to 6, a portable terminal holder 55 is provided at an upper portion of the upper holder 42 in the embodiment, and as shown in FIG. 6, a personal digital assistance case C that accommodates a personal digital assistance P therein can be attached to the portable terminal holder 55.

Furthermore, as shown in FIGS. 4 and 5, a plus charging terminal 56 and a minus charging terminal 57 are provided at the portable terminal holder 55, and it is possible to charge up the personal digital assistance P in a state where the personal digital assistance case C that accommodates the personal digital assistance P therein is attached to the portable terminal holder 55.

Hereinbelow, in the detailed explanation of the portable terminal holder 55 with reference to FIGS. 3 to 5 and 8, the portable terminal holder 55 covers the upper holders 42L and 42R from above, front and back, and right and left.

A base 55A that is fixed to (integrally tightened and coupled to) the lower holders 41L and 41R and the upper holders 42L and 42R with the bolts 45 is provided at the portable terminal holder 55.

In a recess portion 58 (refer to FIG. 8) that is formed at an upper portion of the base 55A, the portable terminal holder 55 is rotatably supported by a first shaft portion 59 that is provided along the vehicle width direction.

The portable terminal holder 55 is provided with: a substantially column-shaped support 60 that extends along the orthogonal direction of the first shaft portion 59; a second shaft portion 61 that is inserted into the front end side of the support 60, extends along the extending direction of the support 60, and is rotatably supported by the support 60 relative thereto; a disk-shaped base 62 that is non-rotatably coupled to the second shaft portion 61 and protrudes toward the radial-outer direction of the shaft portion 61; and a pair of first locking portion 63 and second locking portion 64 that is provided upright on the base 62 and locks the personal digital assistance case C.

With reference to FIG. 5, the portable terminal holder 55 is located on an extension line of the steering axis line L1, particularly, is arranged so that a substantially center of the base 62 is located the steering axis line L1, and is configured to hold the personal digital assistance case C on the steering axis line L1 by use of the first locking portion 63 and the second locking portion 64.

In the embodiment, the base 55A is formed in a substantially rectangle shape in a top view.

Furthermore, the base 55A includes: an upper wall portion 55U that covers the upper holders 42L and 42R from above; a front wall portion 55F that extends downward from the front end of the upper wall portion 55U and covers the upper holders 42L and 42R from front; a left wall portion 55L that extends downward from the left end of the upper wall portion 55U and covers the upper holders 42L and 42R from the left; and a right wall portion 55R that extends downward from the right end of the upper wall portion 55U and covers the upper holders 42L and 42R from the right.

The upper wall portion 55U gradually extends downward in a direction to the rear thereof, and the upper holders 42L and 42 are covered with the back portion of the upper wall portion 55U from the rear.

Four bolt insertion holes 55V through which the bolts 45 are inserted are formed on the upper wall portion 55U.

As a result of allowing the bolts 45 to be inserted into such bolt insertion holes 55V and to be fastened to the bolt fastener holes 41B of the lower holders 41L and 41R, the base 55A is fixed to the lower holders 41L and 41R.

The support 60 is provided at the base 55A, the base 62 is rotatably supported by the first shaft portion 59, that is arranged in parallel with the extending direction of the steering handlebar pipe 10 and is disposed behind the steering handlebar pipe 10, and therefore, the base can swing around the first shaft portion 59 serving as an axis and in the vertical direction.

Additionally, as the base 62 is non-rotatably coupled to the second shaft portion 61, that is rotatably supported by the support 60, the base 62 can rotate around the second shaft portion 61 serving as an axis.

Figure 8:
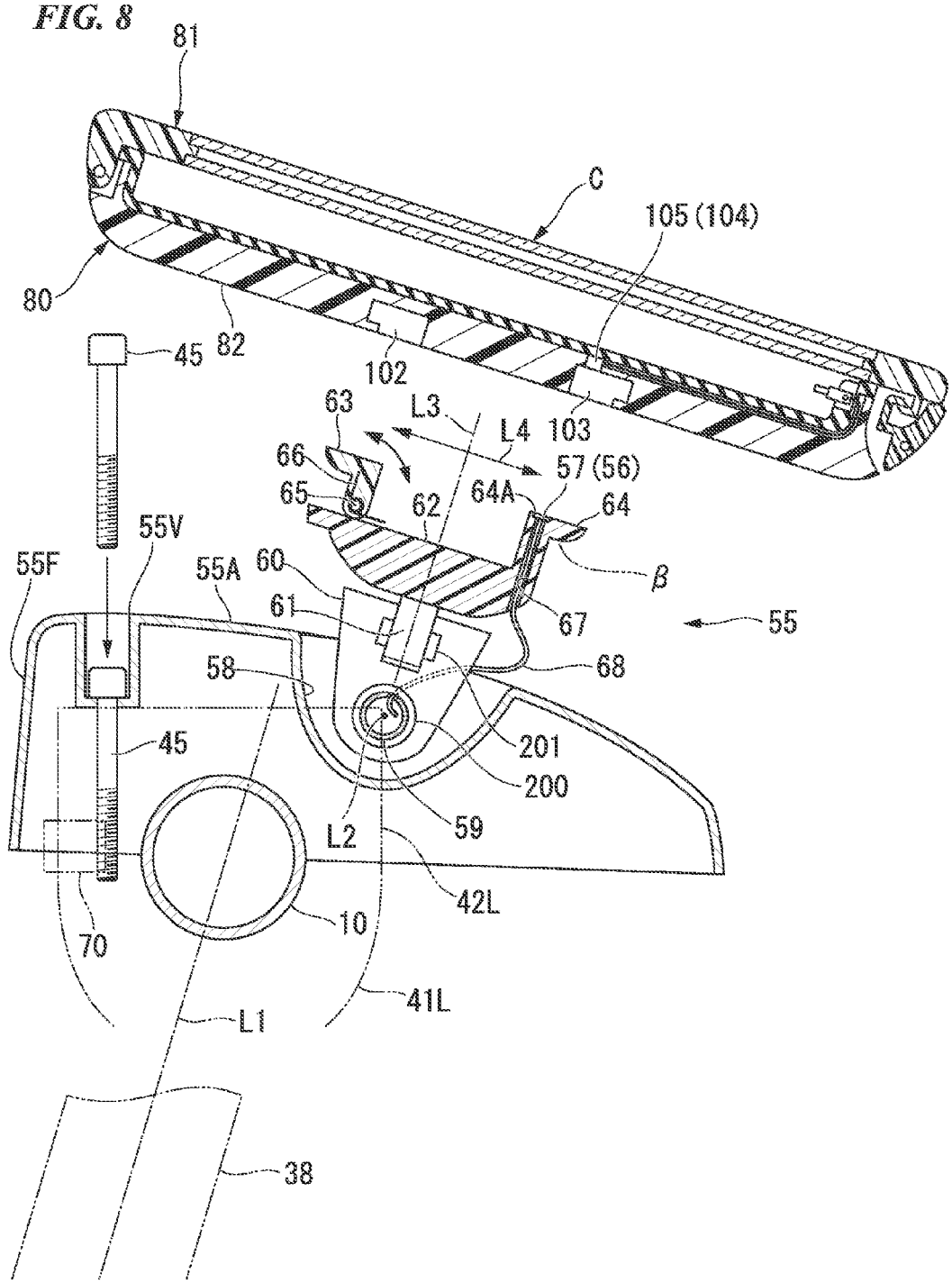
FIG. 8 is a cross-sectional view taken along the line X-X of FIG. 5.

Particularly, in FIG. 8, L2 represents the axis line of the first shaft portion 59 and L3 represents the axis line of the second shaft portion 61.

Furthermore, the first shaft portion 59 rotatably supports the support 60 to be able to hold the orientation thereof in a fixed state; and the support 60 also rotatably supports the second shaft portion 61 to be able to hold the orientation thereof in a fixed state.

As the mechanism that holds the orientation as described above, a first angle adjuster 200 that is provided at the outer-periphery of the first shaft portion 59 and a second angle adjuster 201 that is provided at the outer-periphery of the second shaft portion 61 are provided in the embodiment.

The configurations of such angle adjusters are not particularly limited, for example, a constitution using a ratchet mechanism, a constitution in which an elastic material is disposed between a shaft portion and a bearing face that supports the shaft portion, or the like may be adopted.

Moreover, for convenience in explanation in FIG. 8, the cross-sectional face of the base 62 is not shown.

Each of the first locking portion 63 and the second locking portion 64 is formed in an L-shape in cross section.

End portions of the first locking portion 63 and the second locking portion 64, each of which is one end portion (first end portion), is coupled to a top face of the base 62.

End portions of the first locking portion 63 and the second locking portion 64, each of which is the other end portion (hereinbelow, referred to as a front end, second end portion), are provided upright on the base 62 in a state of being separated from each other so as to be directed in opposite directions.

Additionally, the first locking portion 63 and the second locking portion 64 are located so as to face each other in the radial direction of the axis line L3 so as to sandwich the axis line L3.

Here, in FIG. 8, L4 represents a parallel-providing direction in which the first locking portion 63 and the second locking portion 64 are arranged in the radial direction of the axis line L3.

In the embodiment, the first locking portion 63 is supported by the shaft 65, that is inserted into the end portion of the first locking portion 63 located close to the base 62, so as to be able to rotate as shown in the rotation arrow of FIG. 8.

In contrast, swinging of the first locking portion 63 in the direction opposite to the direction from the first locking portion 63 to the second locking portion 64 from the state where the first locking portion 63 is provided upright on the base 62 along the axis line L3 is restricted.

The diagramatic representation of the mechanism that restricts such swinging is omitted; for example, it is only necessary to provide a stopper that comes into contact with the base 62 and thereby restricts rotation of the first locking portion 63.

Additionally, the shaft 65 is inserted into a coil spring 66, the first locking portion 63 is maintained in a state of being provided upright on the aforementioned base 62 along the axis line L3, as a result of being pressed by the coil spring 66 (elastic restorative force is operated).

In contrast, the second locking portion 64 is formed integrally with the base 62.

In addition, a constitution in which the first locking portion 63 swings with being rotatably supported is adopted in the embodiment; however, a constitution which slides in the direction parallel to the surface of the base 62 may be adopted.

Here, in the embodiment, a power supply, that is constituted of the above-mentioned plus charging terminal 56 and the minus charging terminal 57, is provided at a portion 64A located in the direction in which an L-shaped bend portion of the second locking portion 64 is placed upright, i.e., at the portion 64A facing the personal digital assistance P.

The plus charging terminal 56 and the minus charging terminal 57 are provided on the portion 64A with a distance therebetween.

This means that, in the direction in which the first locking portion 63 and the second locking portion 64 are arranged and the first locking portion 63 and the second locking portion 64 are included, the plus charging terminal 56 and the minus charging terminal 57 are provided on the second locking portion 64.

Consequently, as shown in FIG. 8, guide holes 67 are formed to penetrate through the second locking portion 64 and the base 62 along the axis line L3, and a connection line 68 that is electrically conducted to the plus charging terminal 56 and the minus charging terminal 57 pass through the guide holes 67.

Here, since the connection line 68 is attached to the second locking portion 64 that cannot swing while the first locking portion 63 is only a swinging portion in the embodiment, control of flexing of the connection line 68 is easy.

Particularly, in this case, since it is possible to reduce flexing of the connection line 68 which is due to swing or the like, control of flexing is easy, and it is possible to improve the degree of freedom in design.

Additionally, in the embodiment, the plus charging terminal 56 and the minus charging terminal 57 are configured to be arranged in the direction orthogonal to the parallel-providing direction L4 of the first locking portion 63 and the second locking portion 64; however, a constitution that is arranged along L4 may be adopted.

The first locking portion 63 and the second locking portion 64 are inserted into a pair of locking holes formed in the personal digital assistance case C by adequately swinging the first locking portion 63.

In above-mentioned locking holes, as a result of allowing the front end of one of the first locking portion 63 and the second locking portion 64 to come into contact with the personal digital assistance case C from one direction, the personal digital assistance case C is positionally-fixed.

Furthermore, as a result of allowing the other front end to come into contact with the personal digital assistance case C from the other direction that is directed to the opposite direction of said one direction, the personal digital assistance case C is positionally-fixed, and the personal digital assistance case C is thereby attached thereto.

Moreover, explanation of this attachment will be described hereinbelow.

Next, in the explanation of the aforementioned connection line 68, the plus charging terminal 56 and the minus charging terminal 57 supplies electric power to the personal digital assistance P from the battery B through the connection line 68.

The connection line 68 is connected to a voltage converter 70 that lowers a voltage of the battery B.

Figure 10:
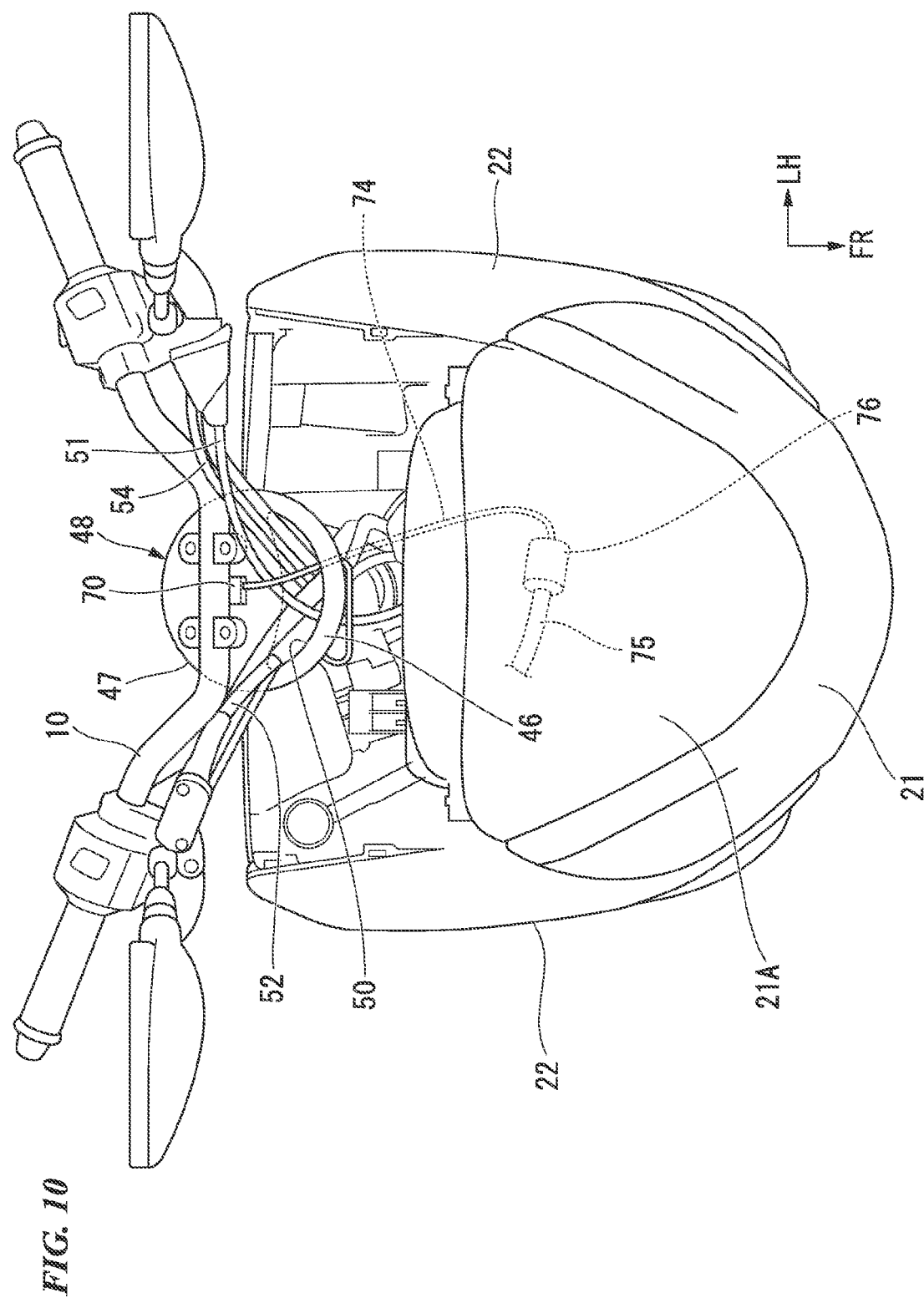
FIG. 10 is an overhead view showing the periphery of the steering handlebar pipe of the motorcycle related to the embodiment of the invention when viewed rearward and downward from above the vehicle.

Here, with reference to FIGS. 2, 8, and 10, the voltage converter 70 is disposed between the right and left lower holders 41L and 41R and the upper holders 42L and 42R and on the top surface of the rear-half portion 47 of the steering handlebar cover 48 when seen from the axial direction of the steering axis line L1 in the embodiment.

A part of the voltage converter 70 is located behind the straight line L6 that connects the front ends of the right and left lower holders 41L and 41R and connects the front ends of the right and left upper holders 42L and 42R.

Particularly, in a side view of the vehicle, the voltage converter 70 is disposed in front of the steering axis line L1.

Figure 9:
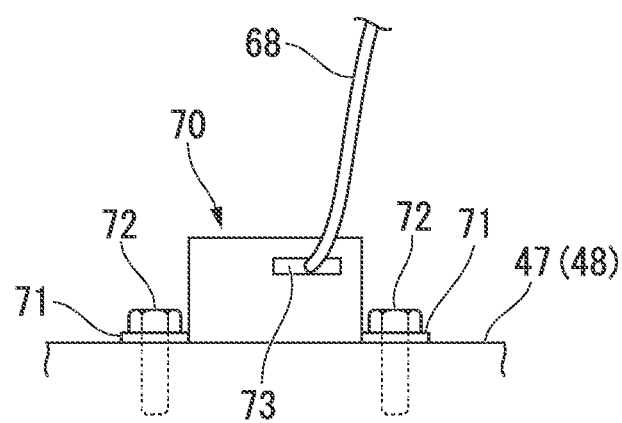
FIG. 9 is an enlarged view showing a voltage converter that is disposed at a steering handlebar cover with which the motorcycle related to the embodiment of the invention is provided.

Furthermore, as shown in FIG. 9, the voltage converter 70 includes a pair of flange portions 71 that is in contact with the top surface of the rear-half portion 47 and is fixed thereto by inserting bolts 72 into the flange portions 71.

Consequently, as shown in FIG. 9, the connection line 68 is detachably connected to the voltage converter 70 via a connector 73, extends upward from the voltage converter 70, is disposed inside the base 55A, passes through the inside of the first shaft portion 59 from the inside of the base 55A as shown in FIG. 8, thereafter, is drawn from a suitable position of the first shaft portion 59 to the outside thereof, passes through the guide hole 67, and is connected to the plus charging terminal 56 and the minus charging terminal 57.

Figure 11:
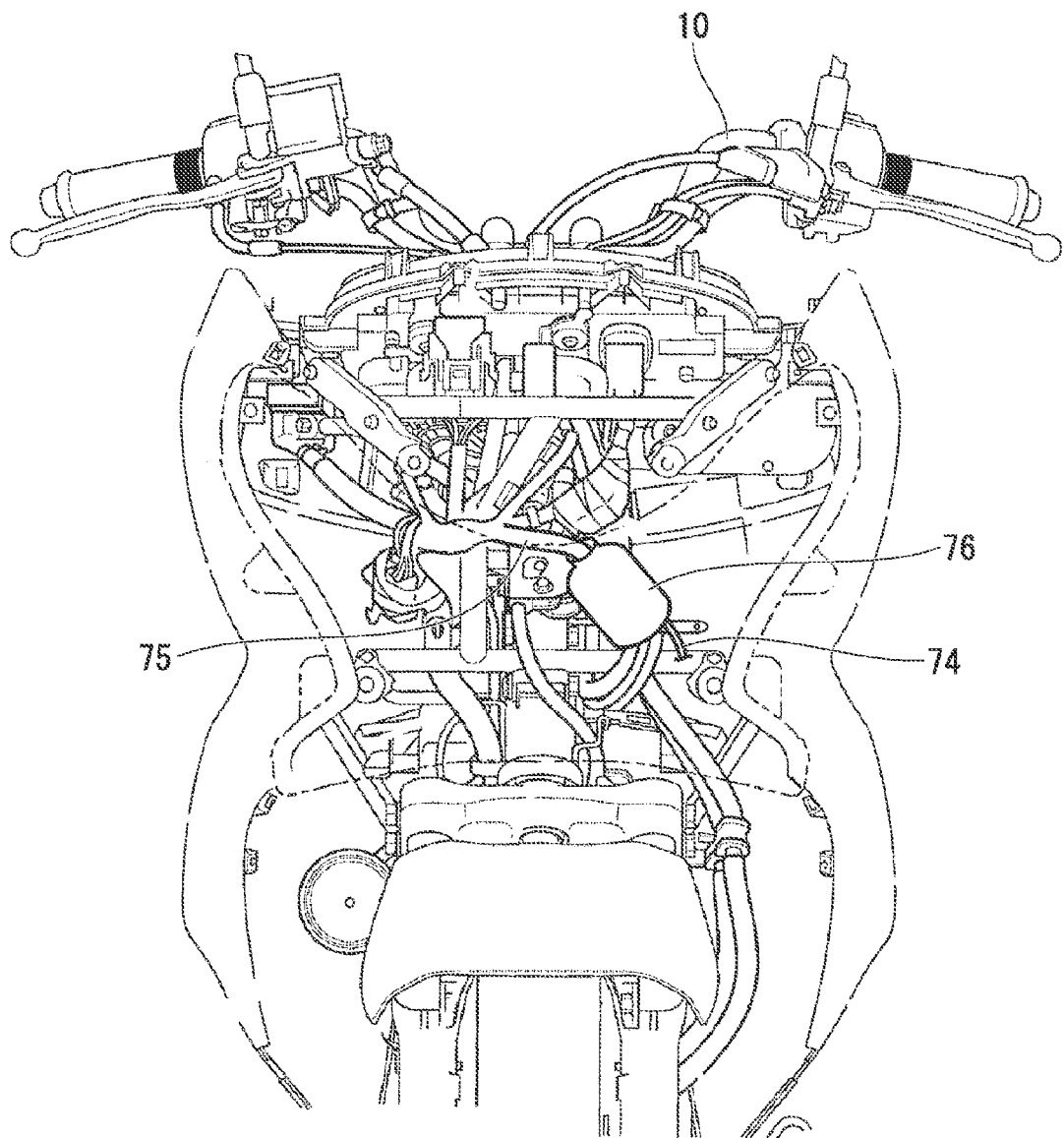
FIG. 11 is a view showing the inner side of a vehicle front portion of the motorcycle related to the embodiment of the invention.
Figure 12:
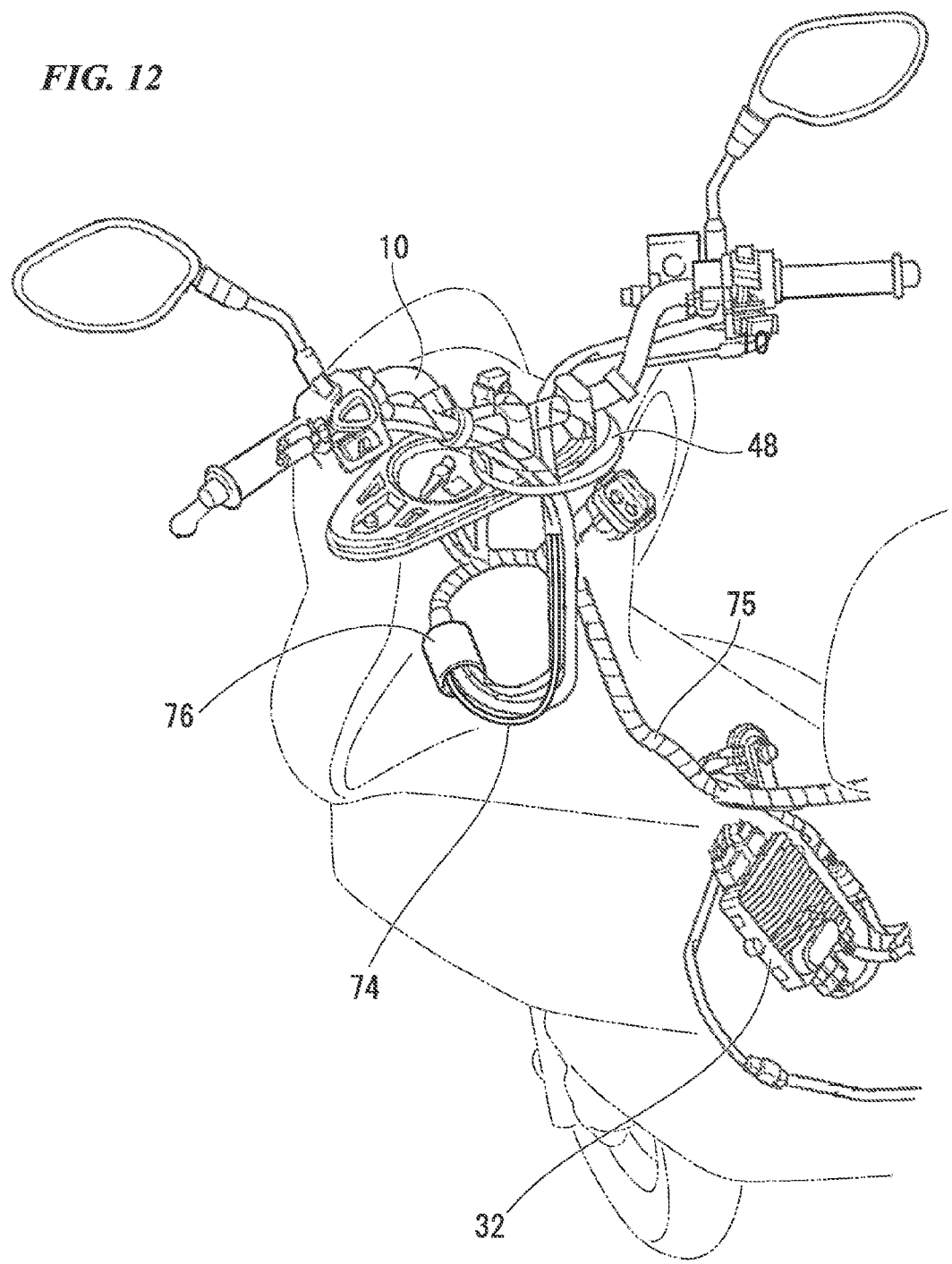
FIG. 12 is a view showing a main harness of the motorcycle related to the embodiment of the invention.

In contrast, with reference to FIGS. 10 to 12, the voltage converter 70 and the battery B are connected to the battery B through a relay electric cord 74 and a main harness 75.

As shown in FIG. 12, the main harness 75 is a plurality of bundled harnesses such as wiring that supplies electric power from the battery B to an auxiliary machine or a sensor which are mounted on the vehicle, wiring that outputs information detected by the sensor to the ECU 32, or the like.

The main harness 75 extends in the front-back direction of the vehicle and is provided on the vehicle so that a coupler 76 in which a plurality of connectors for each wiring as described above are bundled is disposed in front of the head pipe 12 as shown in FIGS. 10 and 11.

Subsequently, as shown in FIG. 10, the relay electric cord 74 extends downward from the voltage converter 70 through the cable routing hole 50 of the steering handlebar cover 48, extends forward after passes through the front of the steering shaft 9 and the head pipe 12, and is connected to a connector which is included in the coupler 76 and is not shown.

Additionally, the coupler 76 includes a connector or the like to which the handlebar switch cable 54 is connected therein.

Figure 13:
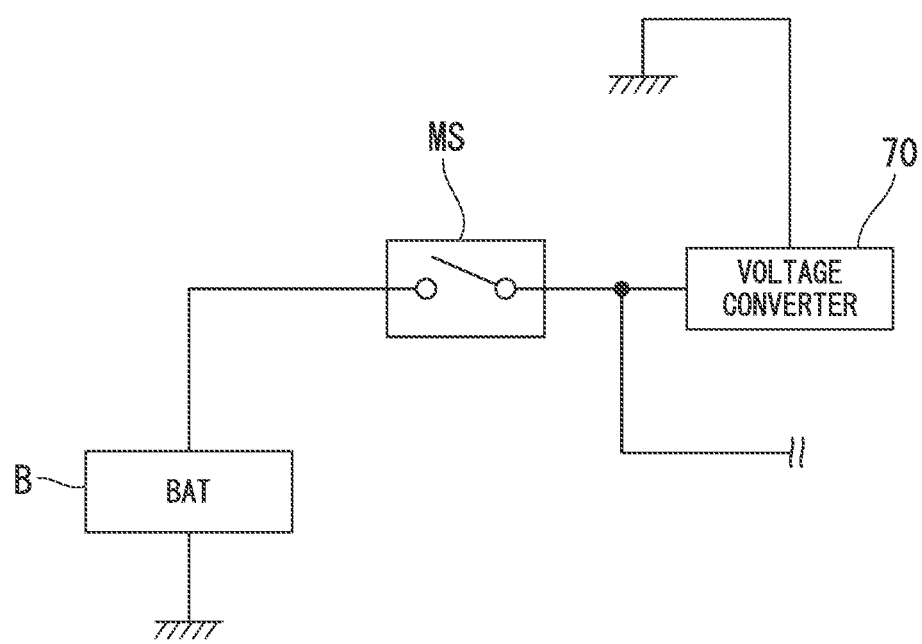
FIG. 13 is an electrical diagram illustrating a battery and a voltage converter of the motorcycle related to the embodiment of the invention.

Here, FIG. 13 is an electrical diagram showing connection of the battery B and the voltage converter 70.

As shown in this drawing, the voltage converter 70 is disposed in the downstream side of a main switch MS and is configured to electrically conduct with the battery B when the main switch MS becomes turn-on state due to a key operation by the driver.

Because of this, it is possible to prevent unintentional charging when the vehicle is stopped.

Next, the personal digital assistance case C will be described.

Figure 14A:
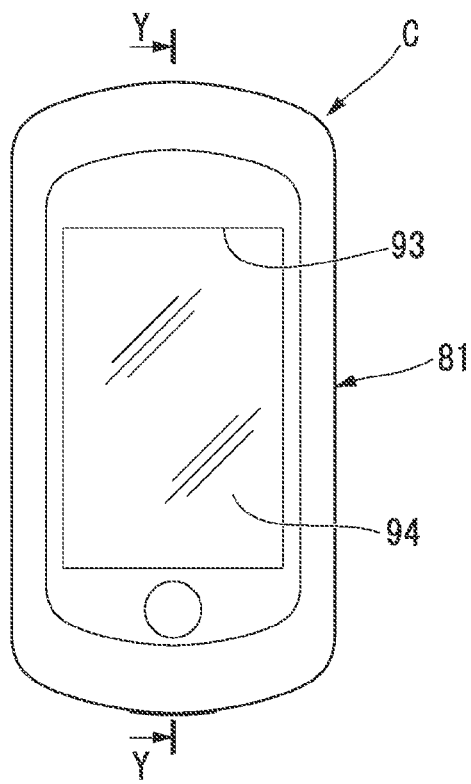
FIG. 14A is a front view showing a personal digital assistance case that accommodates a personal digital assistance therein which is attached to the portable terminal holder related to the embodiment of the invention.

FIG. 14A is a front view showing the personal digital assistance case C.

Figure 14B:
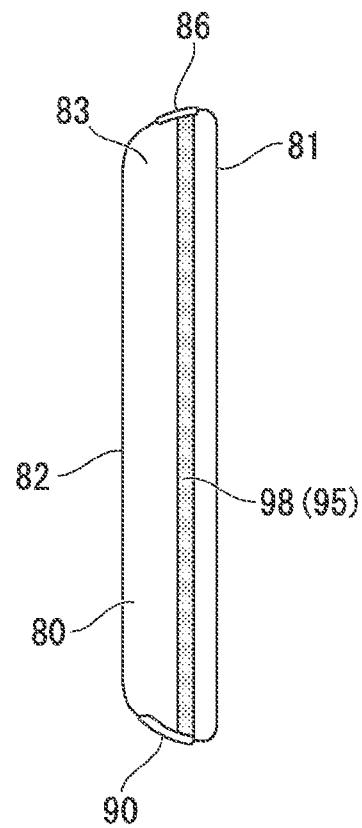
FIG. 14B is a left side view showing the personal digital assistance case that accommodates the personal digital assistance therein which is attached to the portable terminal holder related to the embodiment of the invention.

FIG. 14B is a left side view showing the personal digital assistance case C.

Figure 14C:
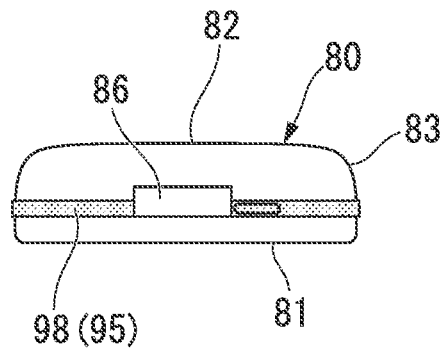
FIG. 14C is a plan view showing the personal digital assistance case that accommodates the personal digital assistance therein which is attached to the portable terminal holder related to the embodiment of the invention.

FIG. 14C is a plan view showing the personal digital assistance case C.

Figure 14D:
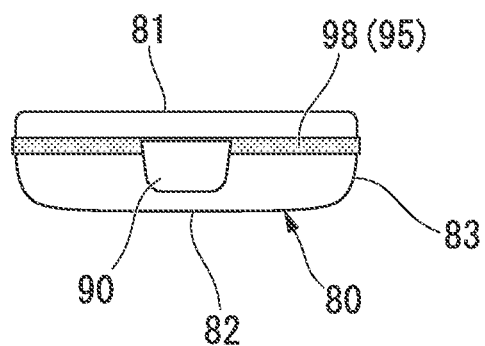
FIG. 14D is a bottom view showing the personal digital assistance case that accommodates the personal digital assistance therein which is attached to the portable terminal holder related to the embodiment of the invention.

FIG. 14D is a bottom view showing the personal digital assistance case C.

Figure 14E:
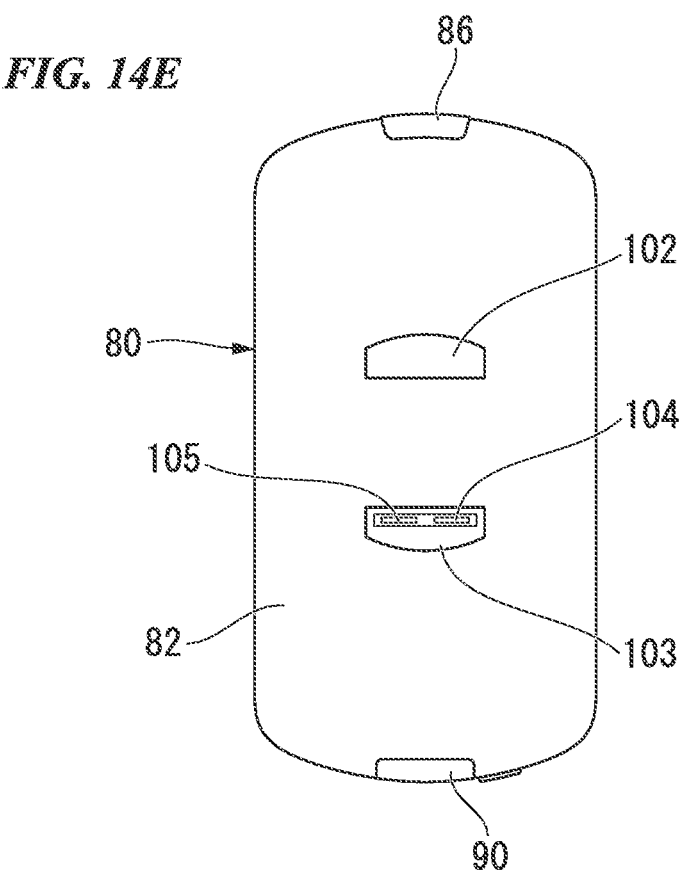
FIG. 14E is a back view showing the personal digital assistance case that accommodates the personal digital assistance therein which is attached to the portable terminal holder related to the embodiment of the invention.

FIG. 14E is a back view showing the personal digital assistance case C.

Figure 14F:
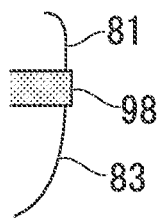
FIG. 14F is a view showing the personal digital assistance case that accommodates the personal digital assistance therein which is attached to the portable terminal holder related to the embodiment of the invention and is an enlarged view showing a relevant part shown in FIG. 14E.

FIG. 14F is an enlarged view showing a relevant part shown in FIG. 14E.

Figure 16:
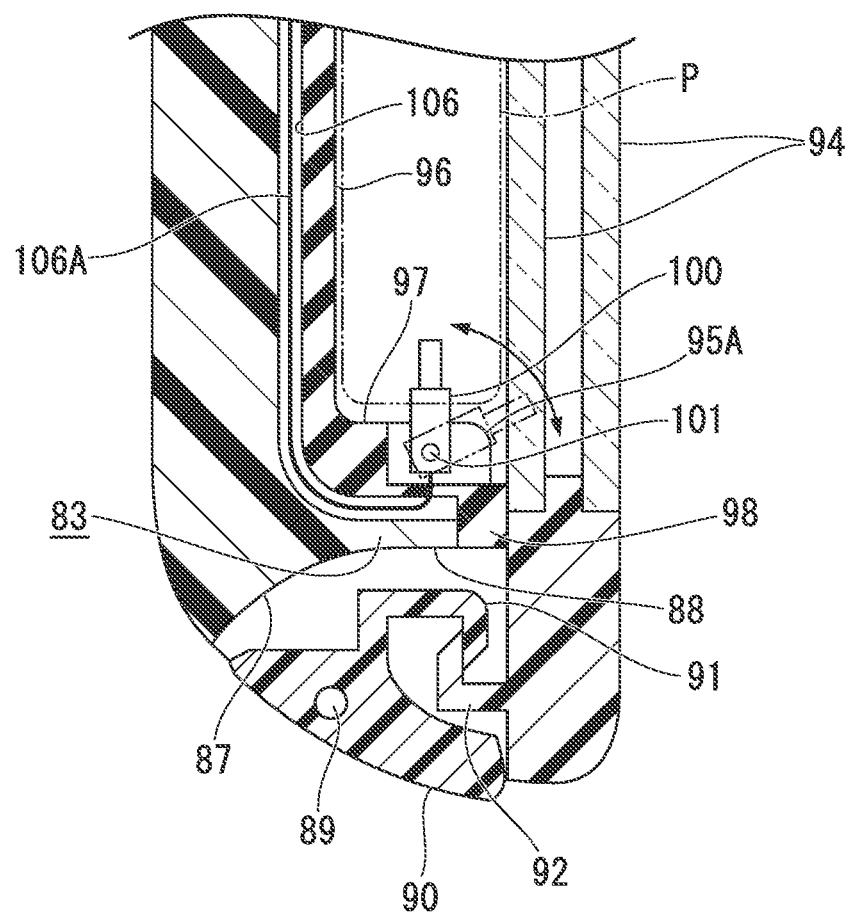
FIG. 16 is an enlarged view showing a relevant part of FIG. 15.

Additionally, FIG. 15 is a cross-sectional view taken along the line Y-Y of FIG. 14A, and FIG. 16 is an enlarged view showing a relevant part of FIG. 15.

Hereinbelow, the personal digital assistance case C will be descried with reference to the direction shown in FIGS. 14A to 14F, a plan view shows the upper side thereof, and a bottom view shows the lower side thereof.

The personal digital assistance case C is a rectangular case that accommodates the personal digital assistance P therein.

The personal digital assistance case C is provided with: a case main body 80 that surrounds the back surface and all circumferences of the side surfaces of the personal digital assistance P and has an opening that opens the front of the personal digital assistance P; and an openable and closable lid member 81 that covers the opening of the case main body 80.

The case main body 80 includes: a back-surface wall portion 82 that surrounds the back surface of the personal digital assistance P; and a side wall portion 83 that is provided upright from the outer circumferential edge of the back-surface wall portion 82 and surrounds all circumferences of the side surfaces of the personal digital assistance P.

The case main body 80 accommodates the personal digital assistance P in the space that is surrounded by the back-surface wall portion 82 and the side wall portion 83 and covers the front surface, on which a display unit (liquid crystal screen) of the personal digital assistance P is provided, with the lid member 81.

Hereinbelow, the surface of the case main body 80 and the lid member 81, at which the case main body 80 is exposed to the outside thereof in a state where the lid member 81 is closed, may be referred to as an external surface; and the surface which is not exposed may be referred to as an inner surface.

The external surface of the side wall portion 83 is formed in a shape that gradually protrudes outward from the back-surface wall portion 82.

As shown in FIG. 15, a cutout is formed at the center portion in the extending direction of an upper side wall portion 84 that is located at the upper side of the side wall portion 83.

A hinge shaft 85 that extends along the extending direction of the upper side wall portion 84 provided in the cutout.

The lid member 81 is provided with a supported portion 86 that is rotatably supported by the hinge shaft 85 at one end of the lid member 81 in the longitudinal direction thereof.

As the supported portion 86 is supported by the hinge shaft 85, the case main body 80 is configured to be openable and closable.

On the other hand, a lower side wall portion 87 that is located at the lower side of the side wall portion 83 is formed so as to have a thickness greater than the thickness of the upper side wall portion 84.

A recessed portion 88 that is depressed in the direction from the external surface to the inner surface is formed at the center portion in the extending direction of the lower side wall portion 87.

A shaft 89 that extends along the extending direction of the lower side wall portion 87 is provided in the recessed portion 88 and a handling button 90 is accommodated therein in a state of being rotatably supported by the shaft 89.

The handling button 90 is formed in an arc shape when seen in a cross-sectional view, has a fixed width in the horizontal direction of the case main body 80; and the outer arc surface of the handling button 90 is directed to the outside of the case main body 80, continuously coincides with the external surface of the case main body 80, and exhibits the inclusion of appearance.

In the handling button 90, the end portion in the arc shaped end portions of the handling button 90, which is located at the back-surface wall portion side 82, is supported by the shaft 89.

Furthermore, the end portion, that is located at the back-surface wall portion side 82 in the handling button 90, is configured to come into contact with the inner surface of the recessed portion 88 when the end portion that is located at the lid member side 81 rotates around the axis of the shaft 89 in the handling button 90 so as to be directed to the outside of the case main body 80.

Consequently, rotation of the handling button 90 which is directed to the outside of the case main body 80 is restricted.

Additionally, the handling button 90 is configured to allow the end portion located at the lid member side 81 to rotate around the axis of the shaft 89 toward the inside of the case main body 80 from the state where the end portion located at the back-surface wall portion side 82 is in contact with or adjacent to the inner surface of the recessed portion 88 in the handling button 90.

Moreover, with reference to FIG. 16, an L-shaped locking end 91, that extends toward the lid member 81 along the side wall portion 83 and allows the end thereof to be directed to the outside of the lower side wall portion 87, is integrally formed at the inner arc surface of the handling button 90.

In contrast, the lid member 81 includes an L-shaped locked end 92 that is provided on the inner surface of the other end side of the lid member 81 in the longitudinal direction thereof.

The end of the locked end 92 is engaged with the end of the locking end 91.

As the end of the locked end 92 is engaged with the end of the locking end 91 in the direction in which the side wall portion 83 is provided upright, a closed state of the lid member 81 is maintained; and as the handling button 90 is operated to rotate and a locking state is released, the lid member 81 opens.

Furthermore, as shown in FIG. 14A, a rectangular window 93 that makes the display unit provided at the front side of the personal digital assistance P visible is formed at the lid member 81.

As shown in FIG. 15, a pair of transparent plate members 94 is arranged at the window 93 in a state of being parallel to each other, and the window 93 is sealed in a double seal structure.

By means of this structure, prevention of fogging of each transparent plate member 94 is achieved.

In particular, such transparent plate members 94 are adhesively-fixed to the peripheral edge of the window 93 in the embodiment.

Furthermore, a spacer 95, that is in contact with the back surface and the side surfaces of the personal digital assistance P, opens the front surface of the personal digital assistance P, and is made of an elastic material, is detachably provided inside the case main body 80.

In the embodiment, the personal digital assistance P is accommodated in the spacer 95 in an elastic support state.

In addition, for convenience in explanation in FIGS. 14B to 14D, the spacer 95 is represented by hatching using dots.

The spacer 95 integrally includes: a back-surface contact wall portion 96 that comes into contact with the back surface of the personal digital assistance P; side-surface contact wall portions 97 that are provided upright from the peripheral edge of the back-surface contact wall portion 96, allow the end portion thereof to protrude from the end portion of the side wall portion 83 of the case main body 80, and come into contact with the side surfaces of the personal digital assistance P at the inner surface thereof; and a flange portion 98 that protrudes from the side-surface contact wall portions 97 toward the end portion of the side wall portion 83.

As shown in FIGS. 14B to 14D, in a state where the lid member 81 is closed, the flange portion 98 is sandwiched between the end portion of the side wall portion 83 and the outer edge of the lid member 81 and is visible from the outside of the personal digital assistance case C.

Furthermore, as shown in FIG. 14F, the outer circumferential edge of the flange portion 98 in the embodiment has a shape which is substantially on the same plane as the external surface of the side wall portion 83 and the external surface of the lid member 81 or which bulges outward from such external surface.

When a user grasps the personal digital assistance case C, the user's hand easily comes into contact with and the flange portion 98, it is difficult to slip, and the outer circumferential edge of the flange portion 98 functions as a fallback.

Moreover, as shown in FIGS. 15 and 16, a lower side wall 95A is in contact with the lower side wall portion 87 at the side-surface contact wall portions 97 of the spacer 95 in the embodiment.

A charging connector 100, that is to be connected to a charging port (not shown in the figure) provided at the end portion of the personal digital assistance P in the longitudinal direction thereof, is provided at the lower side wall 95A.

Particularly, as shown in FIG. 16, the lower side wall 95A is partially cut out, and a shaft 101 disposed in this cutout rotatably supports the charging connector 100 to be directed to the open direction of the spacer 95 and directed to the inside direction of the lower side wall 95A with reference to the rotation arrow in the drawing.

Furthermore, the end of the charging connector 100 protrudes from the lower side wall 95A.

On the other hand, as shown in FIGS. 14 and 15, a first locking hole 102 that accommodates the above-described first locking portion 63 of the portable terminal holder 55 therein and a second locking hole 103 that accommodates the above-described second locking portion 64 therein, which are depressed toward the back surface of the personal digital assistance P, are formed at substantially the center region of the outer face of the back-surface wall portion 82 of the case main body 80.

A plus contact point 104 and a minus contact point 105 that are to be electrically connected to the charging connector 100 are provided in the second locking hole 103.

Here, a groove portion 106 that continuously provided on and crosses over the back-surface wall portion 82 and the lower side wall portion 87 is formed on the inner surfaces of the back-surface wall portion 82 and the side wall portion 83 of the lower side wall portion 87, an electric cord 106A is disposed in the groove portion 106, and the charging connector 100 is thereby connected to the plus contact point 104 and the minus contact point 105.

With reference to FIG. 8, the first locking hole 102 and the second locking hole 103 which match the first locking portion 63 and the second locking portion 64, respectively, are formed in an L-shape in cross section.

As shown in FIG. 15, the plus contact point 104 and the minus contact point 105 are formed in the first locking hole 102 and the second locking hole 103 and on the surface that is directed to the outside of the back-surface wall portion 82.

Particularly, terminals, that are connected to a plus charging contact point and a minus charging contact point which are provided at the charging port of the personal digital assistance P and are not shown in the figure, are provided at the charging connector 100.

With reference to FIGS. 8 and 14A to 16, when the aforementioned personal digital assistance case C is attached to the portable terminal holder 55, the first locking portion 63 is inserted into the first locking hole 102 by being swung while the second locking portion 64 of the portable terminal holder 55 is being inserted into the second locking hole 103 of the personal digital assistance case C.

Accordingly, in a state where the first locking portion 63 and the second locking portion 64 are inserted into the first locking hole 102 and the second locking hole 103, respectively, the plus charging terminal 56 and the minus charging terminal 57 of the second locking portion 64 are electrically connected to the plus contact point 104 and the minus contact point 105, respectively.

The plus charging terminal 56 and the minus charging terminal 57 are electrically connected to the plus charging contact point and the minus charging contact point of the personal digital assistance P through such plus contact point 104 and minus contact point 105, respectively, and it is thereby possible to carry out charging of the personal digital assistance P.

Furthermore, electric power is lowered in voltage by the voltage converter 70 and is supplied to the personal digital assistance P from the battery B.

Moreover, in a state where the first locking portion 63 and the second locking portion 64 are inserted into the first locking hole 102 and the second locking hole 103, respectively, the first locking portion 63 and the second locking portion 64 have an L-shaped cross-sectional face.

In this state, the ends of the first locking portion 63 and the second locking portion 64 lock the personal digital assistance case C in the first locking hole 102 and the second locking hole 103 even in the direction in which the personal digital assistance case C separates from the base 62.

For this reason, stability in the personal digital assistance case C is ensured.

Additionally, with reference to FIG. 15, when the personal digital assistance P is accommodated in the personal digital assistance case C, firstly, the lid member 81 is opened as indicated by reference letter I, the charging port of the personal digital assistance P is connected to the charging connector 100 in a state where the charging connector 100 is directed to the open direction of the spacer 95.

Thereafter, as indicated by reference letter II, the personal digital assistance P is accommodated in the spacer such that both the personal digital assistance P and the charging connector 100 are directed to the inside direction of the side-surface contact wall portions 97 of the spacer 95 while maintaining this connected state.

Figure 17:
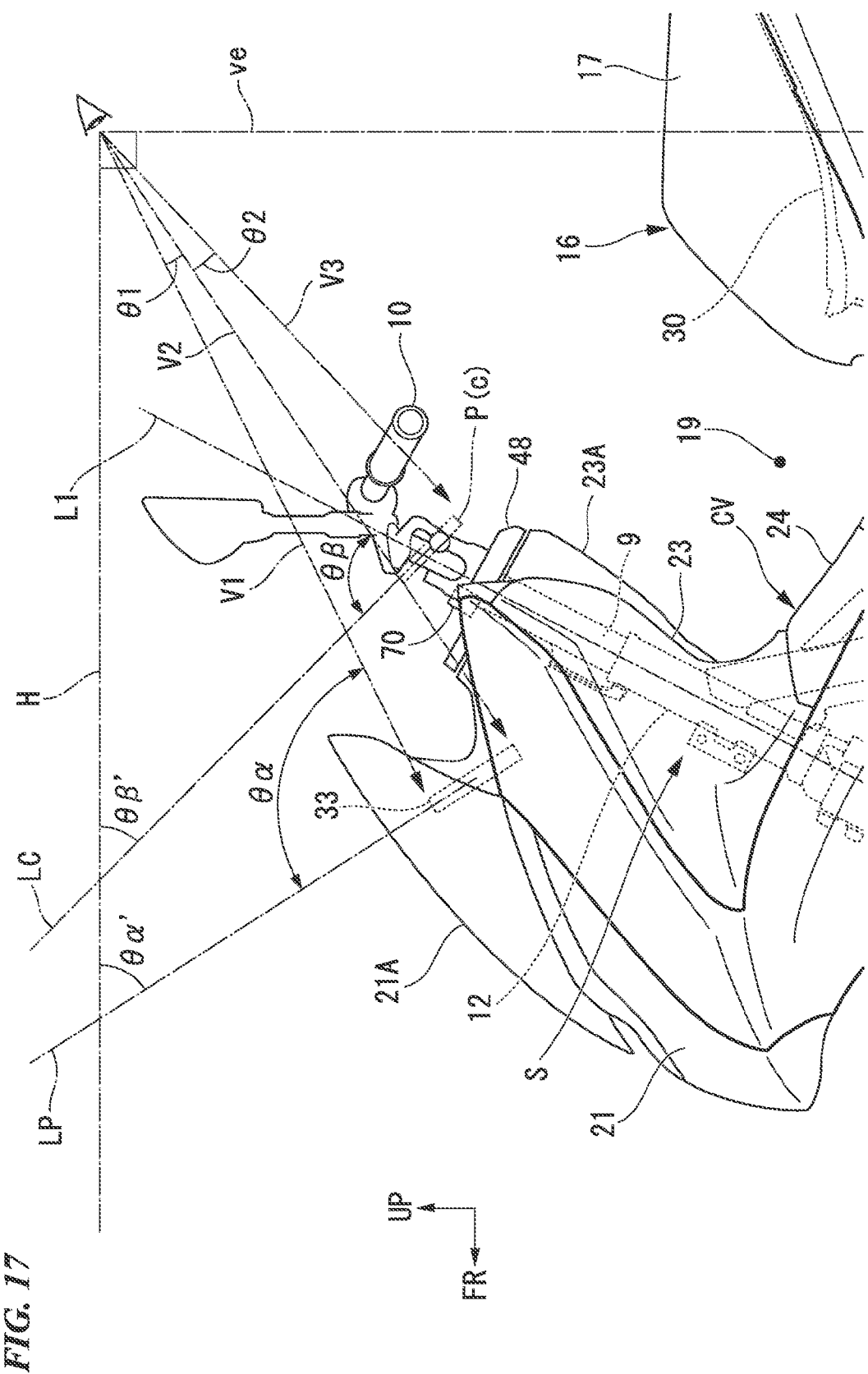
FIG. 17 is an enlarged view showing a relevant part of FIG. 1.

On the other hand, with reference to FIGS. 1 and 17, V1 to V3 indicate part of lines of sight in the viewing field of the driver seated on the seat 16.

The viewing location of the driver is located above the instrument panel 33 and the personal digital assistance case C.

Moreover, the instrument panel 33 is located below and in front of the personal digital assistance case C in a side view.

In addition, V1 is the line of sight in the case where the driver looks straight at the upper end of the instrument panel 33; and V2 is the line of sight that is slightly downwardly inclined with respect to the line of sight V1 and is the line of sight in the case where the driver looks straight the upper end of the personal digital assistance case C.

Here, in the case of focusing the line of sight V2, the substantially lower end of the instrument panel 33 is located in the line of sight V2, the lower portion of the instrument panel 33 is not significantly hidden by the personal digital assistance case C.

Accordingly, even where the personal digital assistance case C is provided, visibility of the instrument panel 33 is ensured.

Consequently, θ1 in drawings (hereinbelow, first view angle θ1) may also be referred to as a viewing field region of the instrument panel 33 for the driver in a side view.

Particularly, accurately, in a side view, the first view angle θ1 is an angle formed between the line of sight V1 when the driver looks straight at the upper end of the instrument panel 33 and the line of sight V2 when the driver looks straight at the upper end (the substantially lower end of the instrument panel 33) of the personal digital assistance case C.

Additionally, in the case where the substantially lower end of the instrument panel 33 is located in the line of sight V2 as described above, since the upper end of the personal digital assistance case C is visible when the substantially lower end of the instrument panel 33 is viewed straight, it can be said that the visibility of the personal digital assistance P is ensured.

This means that, the personal digital assistance case C does not affect visibility of the instrument panel 33 in the embodiment and the case C is maintained at the position at which the driver can easily look at the personal digital assistance P.

In particular, in the example, the state where the personal digital assistance case C is forward tilted in the direction extremely close to the horizontal direction is defined as a reference, and positional relationship on the line of sight V2 between the instrument panel 33 and the personal digital assistance case C is determined.

Additionally, V3 is the line of sight in which the driver looks at the lower end of the personal digital assistance case C and is the line of sight that is slightly downward inclined with respect to the line of sight V2.

Moreover, θ2 (hereinbelow, the second view angle θ2) represents a substantially viewing field region of the personal digital assistance case C for the driver in a side view.

That is, in a side view, the second view angle θ2 is an angle between the line of sight V2 in the case where the driver looks straight at the upper end of the personal digital assistance case C and the line of sight V3 in the case where the driver looks straight at the lower end of the personal digital assistance case C.

Here, since the personal digital assistance case C is held so as to extend forward and upward in the direction from the rear to the front thereof in the embodiment, the second view angle θ2 is suppressed.

Consequently, the entirety of the personal digital assistance P can easily be visible for the driver.

Furthermore, in the embodiment, it is apparent from FIG. 17 that, the relationship of the first view angle θ1+the second view angle θ2<90 degrees is established.

In addition, the line LP in the drawing indicates the extending direction that extends forward and upward in the side view showing the direction parallel to the surface of the display unit of the instrument panel 33, and the line LC in the drawing indicates the extending direction that extends forward and upward in the side view showing the direction parallel to the surface of the personal digital assistance case C.

Furthermore, θα in the drawing indicates a first eye point angle that is formed between the line of sight V1 and the line LP in a side view, and θp in the drawing indicates a second eye point angle that is formed between the line of sight V2 and the line LC in a side view.

Additionally, θα' in the drawing indicates a panel inclination angle that is formed between the horizontal line of sight H when the driver looks at the front along the horizontal direction parallel to a ground surface and the line LP in a side view, and θβ' in the drawing indicates a terminal inclination angle that is formed between the horizontal line of sight H when the driver looks at the front along the horizontal direction parallel to a ground surface and the line LC in a side view.

In addition, ve indicates the vertical line orthogonal to the horizontal line of sight H from the driver's point of view.

Here, in the embodiment, the relationship of 90 degrees≤θα1≤180 degrees and 90 degrees≤θβ≤180 degrees is established.

Furthermore, the relationship of θα'>θβ' is established.

The relationship that the personal digital assistance case C is in a state of being significantly inclined forward with respect to vertical line ve more than the instrument panel 33 is established in a side view.

Particularly, since the personal digital assistance P is accommodated in the personal digital assistance case C in the embodiment, the above-described angle is determined based on the upper end and the lower end of the personal digital assistance case C.

Even in the case where the personal digital assistance case C is removed and the angle is determined based on the upper end and the lower end of the personal digital assistance P, the relational expression similar to the above-description is established.

Furthermore, as shown in both FIGS. 6 and 8, in a state where the personal digital assistance case C is attached to the portable terminal holder 55, it is possible to upward and downward swing the personal digital assistance case C as a result of rotating the support 60 around the first shaft portion 59 (axis line L2) in the portable terminal holder 55.

Figure 7:
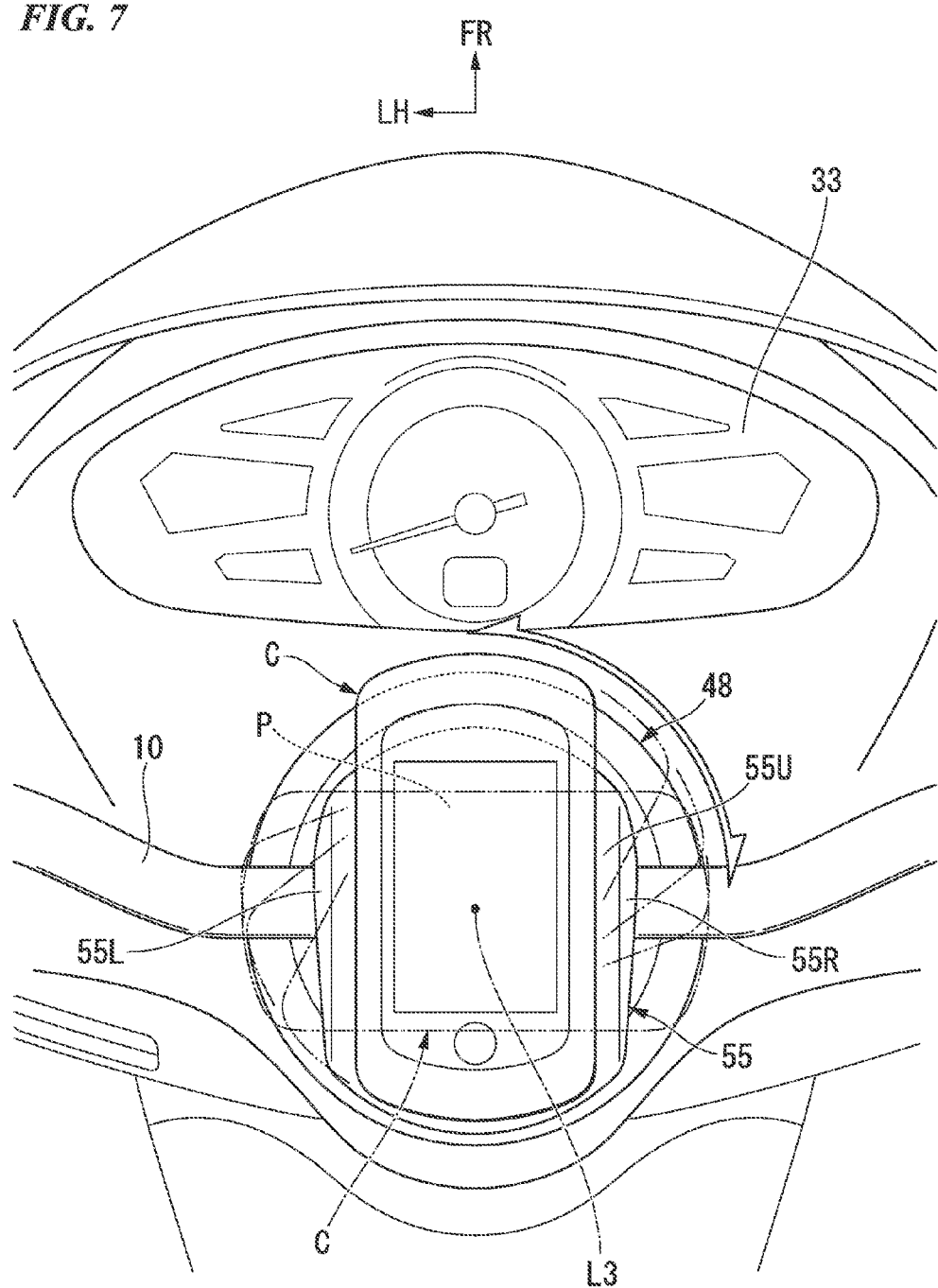
FIG. 7 is an overhead view showing the periphery of the steering handlebar when viewed diagonally forward and downward from above the vehicle in a state where the personal digital assistance is attached to the portable terminal holder related to the embodiment of the invention.

Additionally, as shown in both FIGS. 7 and 8, it is possible to rightward and leftward rotate the personal digital assistance case C as a result of rotating the base 62 around the second shaft portion 61 (the axis line L3) with respect to the support 60.

Consequently, as a result of such rotational adjustment, it is possible to cause the personal digital assistance P to be on an orientation corresponding to the preference of the user.

Particularly, by allowing the personal digital assistance case C to be inclined such that the first locking portion 63 swings, the personal digital assistance case C is easily removed from the portable terminal holder 55.

In the embodiment of the invention as described above, the portable terminal holder 55 is provided at the steering handlebar holder 40 that is provided above the steering shaft 9 serving as a steering shaft and is located on the steering axis line L1.

According to this structure, since the portable terminal holder 55 is prevented from swinging during rotation of the steering handlebar pipe 10, it is possible to hold the personal digital assistance P in the portable terminal holder 55 in a stable state as compared with the case of being attached at the position displaced from the steering axis line L1 (offset position).

Furthermore, since the portable terminal holder 55 is fastened to the upper holders 42 and the lower holders 41 at the steering handlebar holder 40, it is possible to reduce the number of components related to provide the portable terminal holder.

Moreover, the instrument panel 33 is disposed in front of the steering handlebar pipe 10, the portable terminal holder 55 holds the personal digital assistance P so that the upper end of the personal digital assistance P is close to the line of sight V2 in which the driver seated on the seat 16 looks at the lower end of the instrument panel 33.

Accordingly, it is possible to ensure excellent visibility of the instrument panel 33 and the personal digital assistance P.

Moreover, the portable terminal holder 55 is provided with: the base 55A that is placed above the upper holders 42L and is fastened to the lower holders 41L; and the locking portions (63 and 64) that protrudes from the base 55A and holds the personal digital assistance.

Since the upper holders 42L are covered with the base 55A, the protection performance of the upper holders 42L and an excellent entire appearance of the vehicle can be obtained.

Furthermore, since the base 55A is formed in a backward and downward inclined shape, it is easy to dispose the personal digital assistance P at the position which is easily visible for the driver, and an excellent appearance is obtained.

Moreover, the portable terminal holder 55 includes the shaft portion (59) that is parallel to the extending direction of the steering handlebar pipe 10 that is held by the steering handlebar holder 40, and the locking portions (63 and 64) can rotatable around the shaft portion (59).

Since the shaft portion (59) is disposed behind the steering handlebar pipe 10, the portable terminal holder 55 is prevented from protruding in the vertical direction due to provision of the shaft portion, and it is possible to rotate the locking portion in a compact situation.

Figure 18:
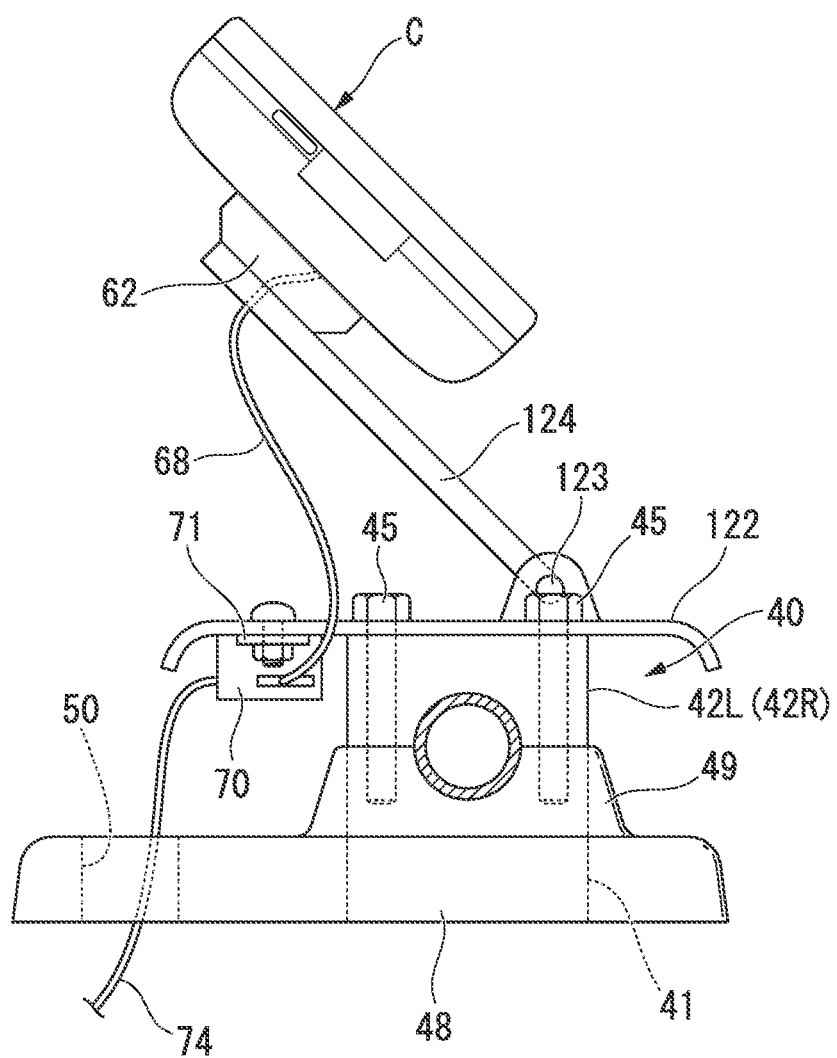
FIG. 18 is a view illustrating a modified example 1 of the embodiment of the invention.

Next, a modified example 1 of the aforementioned embodiment will be described with reference to FIG. 18.

Particularly, in each modified example which will be described below, identical symbols are used for the constituent elements which are the same as that of the aforementioned embodiment, and the detailed explanations thereof are omitted here, and the direction of the vehicle is used as a reference.

In the modified example 1, a plate-shaped visor 122 is provided above the upper holders 42L and 42R.

The visor 122 is fastened by the bolts 45 so as to protrude toward the outside of the upper holders 42L and 42R such as back, forth, right, and left.

A stay 124, that can rotate around a rotation shaft 123 as an axis extending in the vehicle width direction, is supported on the top surface of the visor 122.

The base 62 that is similar to the above-mentioned embodiment is fixed to the end of the stay 124 so that the first locking portion 63 and the second locking portion 64 are directed to the driver.

Furthermore, in the modified example 1, the voltage converter 70 is fixed to the bottom surface of the visor 122, and the voltage converter 70 is covered with the visor 122 from above.

Additionally, a flange portion 71 of the voltage converter 70 is in contact with the bottom surface of the visor 122, and the voltage converter 70 is fixed to the visor 122 with a bolt passing through the flange portion 71.

In the aspect of the modified example 1, since the visor 122 that covers the voltage converter 70 from above is fixed to the steering handlebar holder 40, the voltage converter 70 can be protected from rain or the like.

Furthermore, since the voltage converter 70 is fixed to the visor 122, the visor 122 and the voltage converter 70 are integrated into a small set and are fastened to the steering handlebar holder 40, it is possible to realize a high level of operability of assembling therefor.

Figure 19:
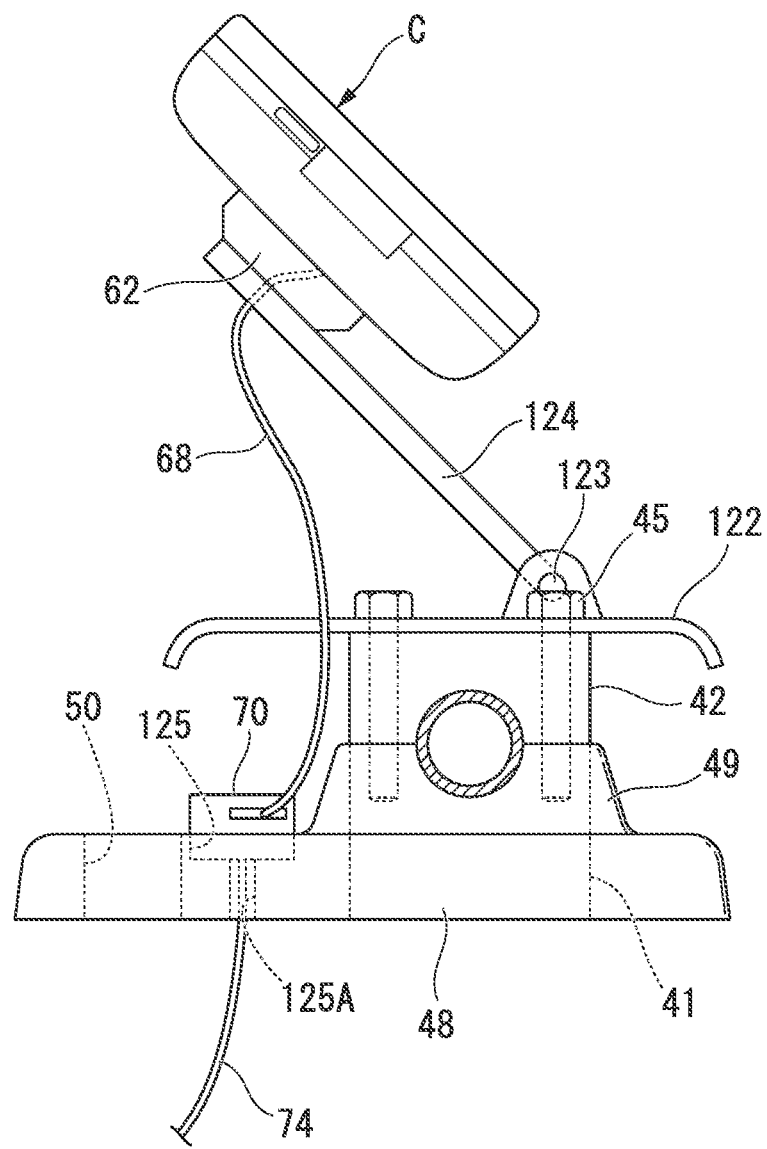
FIG. 19 is a view illustrating a modified example 2 of the embodiment of the invention.

Next, a modified example 2 of the aforementioned embodiment will be described with reference to FIG. 19.

In the modified example 2, the voltage converter 70 is not attached to the visor 122 of the above-described modified example 1.

A hole portion 125 that is depressed downward is formed on the upper portion of the steering handlebar cover 48, and the voltage converter 70 is accommodated in the hole portion 125.

In contrast, the visor 122 only functions as a member that covers the voltage converter 70 from above.

Moreover, a through hole 125A which is used for the relay electric cord 74 that penetrates through the cover 48, extends from the voltage converter 70, and serves as a wiring, is formed under the hole portion 125.

In the aspect of the above-described modified example 2, it is possible to hold the voltage converter 70 in a stable state.

Next, a modified example 3 of the aforementioned embodiment will be described with reference to FIG. 20.

Figure 20:
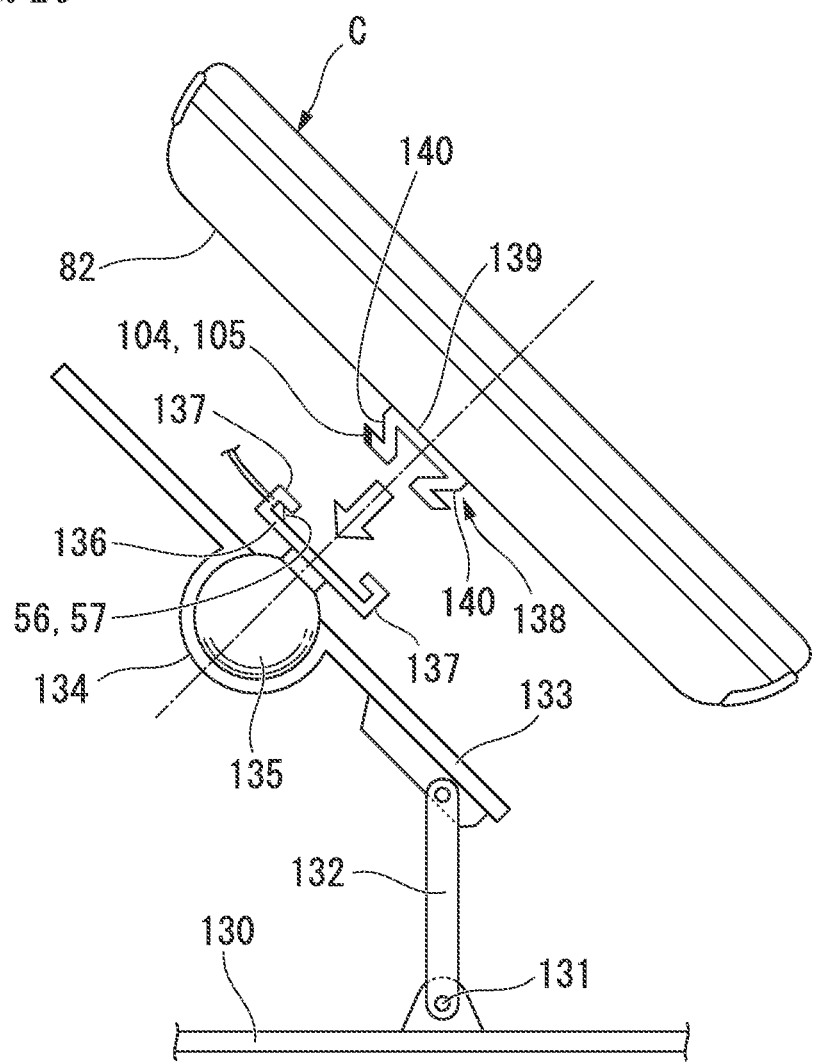
FIG. 20 is a view illustrating a modified example 3 of the embodiment of the invention.

In the modified example 3, as shown in FIG. 20, a portable terminal holder is provided with: a base plate 130 that is attached to the steering handlebar holder 40; a stay 132 that is rotatably supported by a rotation shaft 131 disposed on the top surface of the base plate 130 so as to extend in the vehicle width direction; a holding plate 133 that is fixed to the end of the stay 132; a ball joint portion 135 that is swingably fitted into a spherical surface receiving portion 134 formed on the holding plate 133, can maintain the orientation thereof at a constant state, and allows a part thereof to exposed from the spherical surface receiving portion 134; a disk-shaped base 136 that is coupled to the part of the ball joint portion 135 which is exposed from the spherical surface receiving portion 134; and a pair of locking ends 137 that is provided upright at the base 136.

The ball joint portion 135 is made of an elastic material and is pressed into the spherical surface receiving portion 134.

Each locking end 137 is formed in an L-shape in cross section, one end of each locking end 137 is coupled to the base 136, and the locking end 137 is provided upright at the base 136 in a state where the other ends of the locking ends 137 face each other.

Furthermore, the plus charging terminal 56 and the minus charging terminal 57 are provided at the inner surface of the base end side of one of the locking ends 137.

On the other hand, a locked end 138 that is to be engaged with a pair of the locking ends 137 is provided on the back-surface wall portion 82 of the personal digital assistance case C.

The locked end 138 is provided with: a plate-shaped base portion 139 that is fixed to the back-surface wall portion 82 in a state of being in contact therewith; and a pair of claw portions 140 that is provided upright at the base portion 139 and is formed in an L-shape in cross section.

The paired claw portions 140 include: first portions that are located between the base portion 139 and bend portions; and second portions that are located between the bend portions and ends thereof.

The first portions of the paired claw portions 140 extend in the direction in which they approach each other.

The second portions extend the bend portions to the end thereof in the direction away from each other.

Moreover, in the case where the axis line that passes through the intermediate position between the claw portions 140 and extends in the direction in which the paired claw portions 140 are provided upright is defined as a reference, inclined surfaces that gradually comes close to the above-mentioned axis line in the upright provision direction are formed at the ends of the paired claw portions 140.

Additionally, the plus contact point 104 and the minus contact point 105 are provided at one end of the paired claw portions 140.

In the modified example 3, when the personal digital assistance case C is attached to the portable terminal holder, the above-mentioned paired claw portions 140 are engaged with the paired locking ends 137 so as to push therebetween.

At this time, since the first portions that are from the base portion 139 to the bend portions are formed in a shape that extends in the direction in which they come close to each other, as a result of allowing the inclined surfaces of the ends of the claw portions 140 to come in contact with the locking ends 137, the claw portions 140 are easily bent, and the ends of the claw portions 140 can be smoothly engaged with the insides of the locking ends 137.

Furthermore, in the state where the ends of the claw portions 140 are engaged with the insides of the locking ends 137, the plus charging terminal 56 and the minus charging terminal 57 are electrically conducted to the plus contact point 104 and the minus contact point 105, respectively.

Next, a modified example 4 of the aforementioned embodiment will be described with reference to FIGS. 21A and 21B.

In the modified example 4, the positions of the plus charging terminal 56 and the minus charging terminal 57 are different from that of the aforementioned embodiment.

Moreover, in accordance with this, configurations of the plus contact point 104 and the minus contact point 105 of the personal digital assistance case C are also different from that of the above-described embodiment.

Additionally, the configuration that excludes this points is the same as that of the above-described embodiment.

Figure 21A:
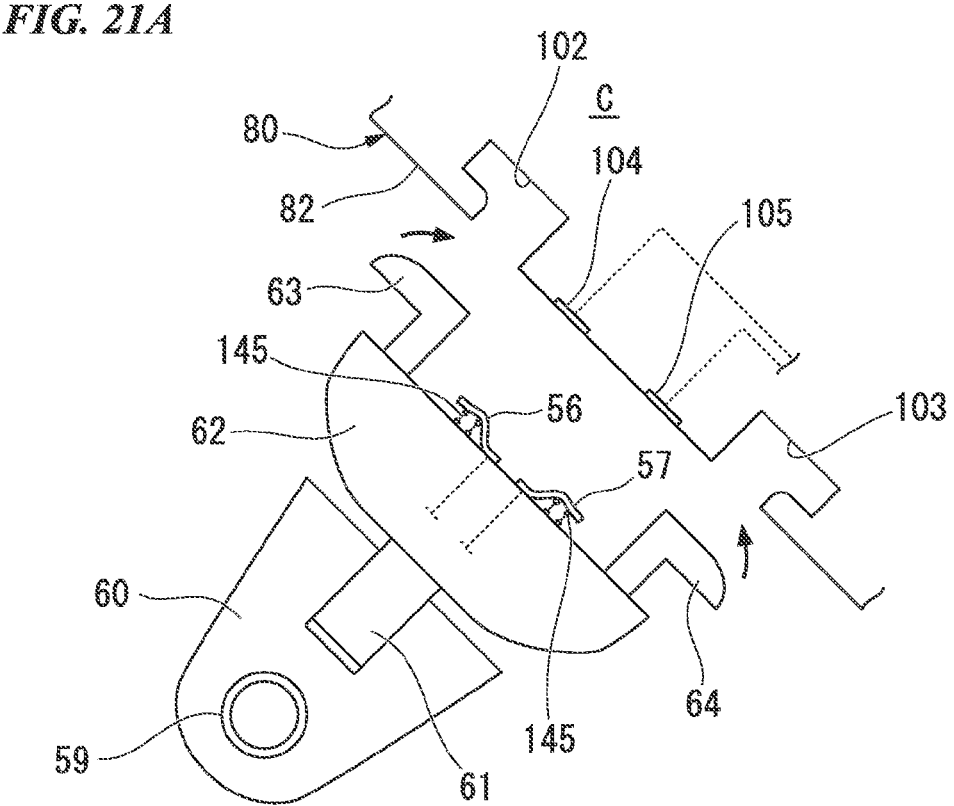
FIG. 21A is a view illustrating a modified example 4 of the embodiment of the invention and is a view showing a pre-attachment state of the personal digital assistance case to the portable terminal holder.

As shown in FIG. 21A, in the modified example 4, the plus charging terminal 56 and the minus charging terminal 57 are arranged on the base 62 and between the first locking portion 63 and the second locking portion 64 in the direction in which the first locking portion 63 and the second locking portion 64 are arranged.

Each of the plus charging terminal 56 and the minus charging terminal 57 are formed of a rectangular plate member.

The plus charging terminal 56 and the minus charging terminal 57 are held in a state where one end of the plate member in the longitudinal direction thereof is fixed to the base 62 and the other end of the plate member is separated from the base 62.

Moreover, a spring 145 is provided between the base 62 and the portion of each end side of the plus charging terminal 56 and the minus charging terminal 57 and biases the portion of each end side of the plus charging terminal 56 and the minus charging terminal 57 in a direction away from the base 62 (elastic restorative force is operated).

In contrast, in the personal digital assistance case C, the plus contact point 104 and the minus contact point 105 are provided on the back-surface wall portion 82 of the case main body 80 and between the first locking hole 102 and the second locking hole 103 so as to correspond the positions of the plus charging terminal 56 and the minus charging terminal 57.

Here, in the modified example, the first locking portion 63 and the second locking portion 64 can be configured to have a locking function, and each thereof may be capable of swinging.

Figure 21B:
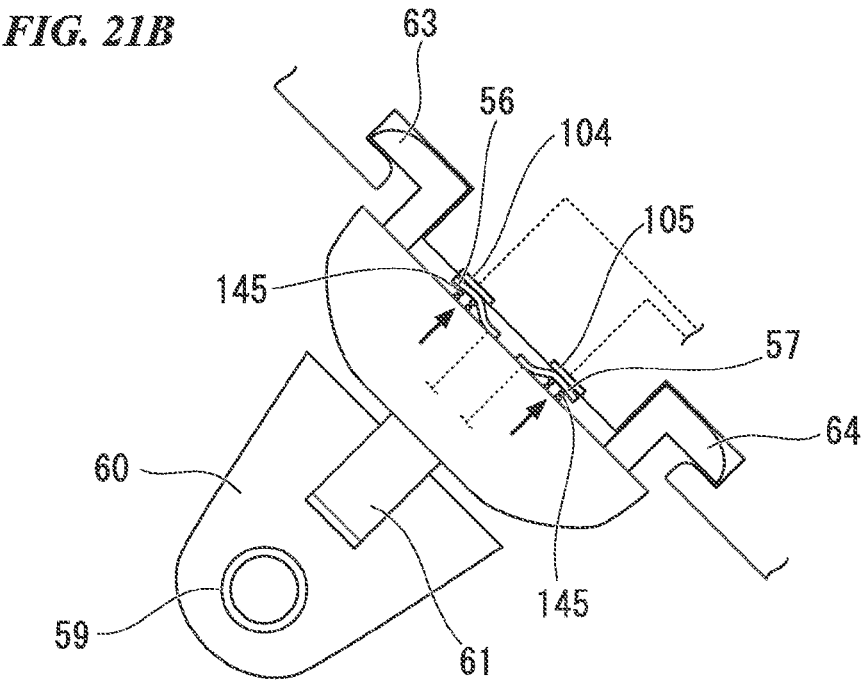
FIG. 21B is a view illustrating the modified example 4 of the embodiment of the invention and is a view showing a state where the personal digital assistance case is attached to the portable terminal holder.

In the aspect of the modified example 4, when the personal digital assistance case C is attached to the portable terminal holder as shown in FIG. 21B, the plus charging terminal 56 and the minus charging terminal 57 are in contact with the plus contact point 104 and the minus contact point 105, respectively, in a state of applying pressure thereto.

Accordingly, stability in charging is ensured.

The above-described aspect can also be effectively utilized for motorcycles in which, for example, vibration is relatively large.

Next, a modified example 5 of the aforementioned embodiment will be described with reference to FIGS. 22A and 22B.

In the modified example 5, the positions of the plus charging terminal 56 and the minus charging terminal 57 are different from that of the above-described embodiment, and a wireless charging system is adopted.

Furthermore, in accordance with this, the configurations of the plus contact point 104 and the minus contact point 105 of the personal digital assistance case C are different from that of the above-described embodiment.

Additionally, the configuration that excludes this points is the same as that of the above-described embodiment.

Figure 22A:
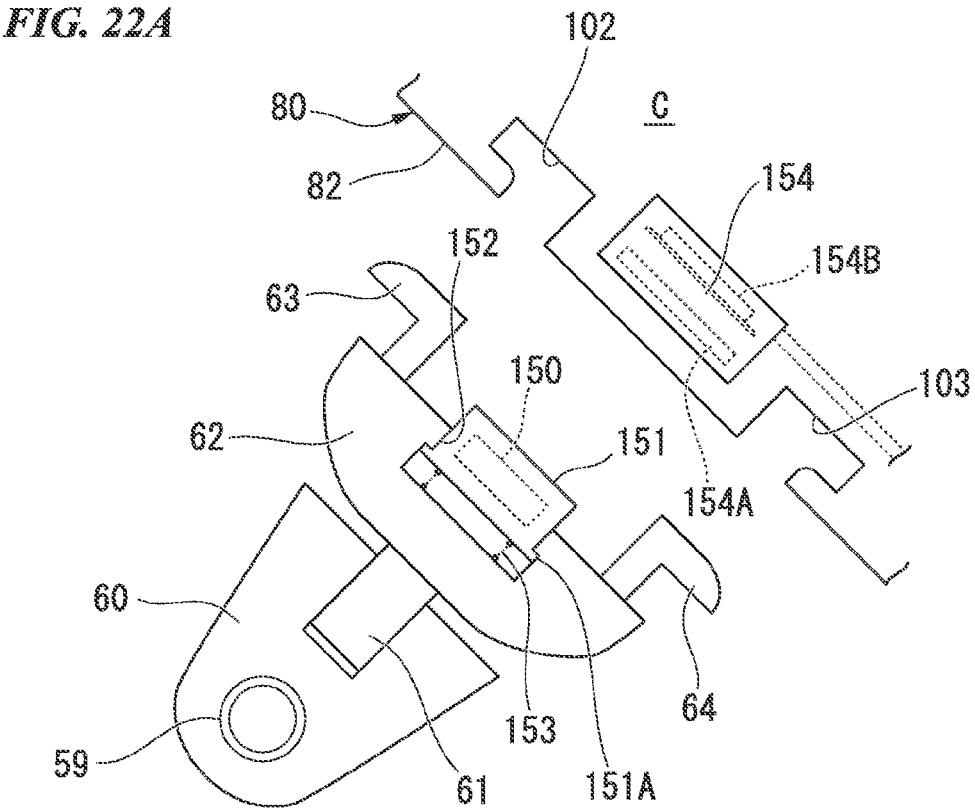
FIG. 22A is a view illustrating a modified example 5 of the embodiment of the invention and is a view showing a pre-attachment state of the personal digital assistance case to the portable terminal holder.

As shown in FIG. 22A, in the modified example 4, a power that supply 151 that accommodates a transmitting coil 150 therein is provided on the base 62 and between the first locking portion 63 and the second locking portion 64 in the direction in which the first locking portion 63 and the second locking portion 64 are arranged.

The power supply 151 is inserted into a hole portion 152 formed on the base 62, a spring 153 is provided between the bottom portion of the hole portion 152 and the power supply 151, and the power supply 151 is held by the hole portion 152 and can be pushed into the bottom side thereof in a state of being pressed by the spring 153.

Additionally, the transmitting coil 150 is configured to be capable of allowing an electrical current that is supplied from the battery B to flow.

In particular, in FIG. 22A, reference numeral 151A represents a stopper that protrudes from the outer peripheral face of the power supply 151 to the outside thereof, and the stopper 151A prevents the power supply 151 being removed from the hole portion 152 of the power supply 151.

Here, in the modified example, the first locking portion 63 and the second locking portion 64 can be configured to have a locking function, and each thereof may be capable of swinging.

In contrast, in the personal digital assistance case C, a reception coil unit 154 is provided inside the back-surface wall portion 82 of the case main body 80.

The reception coil unit 154 is connected to the charging connector 100.

The reception coil unit 154 includes: a coil 154A that is disposed inside the back-surface wall portion 82 and at the outer surface side of the portable terminal holder 55; and a substrate 154B that is disposed closer to the inner surface side than the coil 154A; and the substrate 154B is provided with a circuit that convers an alternating current generated in the coil 154A into a direct current and supplies this to the charging connector 100.

Figure 22B:
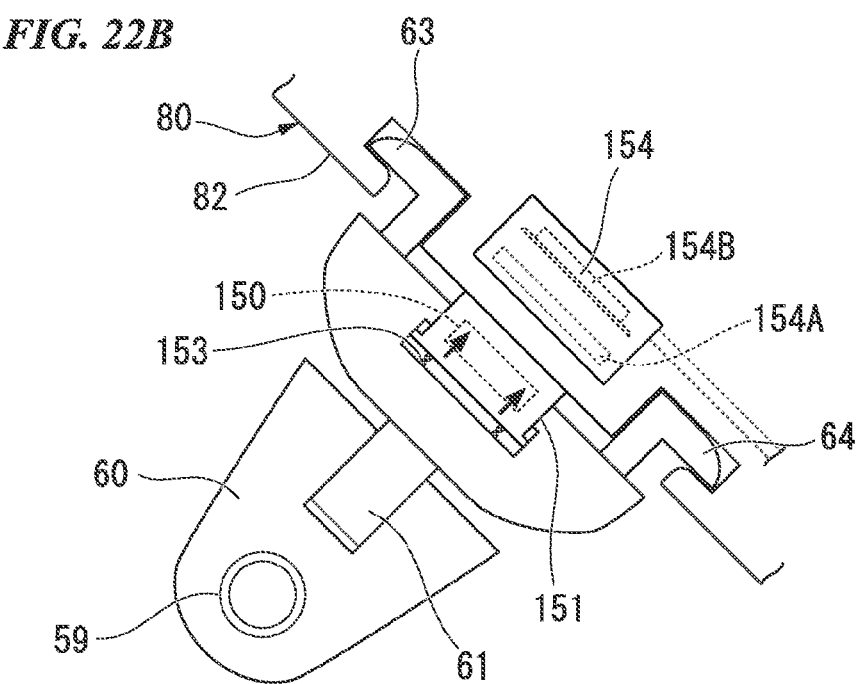
FIG. 22B is a view illustrating the modified example 5 of the embodiment of the invention and is a view showing a state where the personal digital assistance case is attached to the portable terminal holder.

In the aspect of the modified example 5, when the personal digital assistance case C is attached to the portable terminal holder as shown in FIG. 22B, the power supply 151 is in contact with the back-surface wall portion 82 of the case main body 80 in a state of being pressed thereagainst.

Therefore, as a result of allowing electrical current to flow into the transmitting coil 150 and of allowing a magnetic flux that is thereby generated to pass through the coil 154A of the reception coil unit 154, an electrical current flows into the reception coil unit 154, and it is possible to supply electric power to the charging connector 100.

The above-described modified example 5 provides excellent waterproofness.

Additionally, in the example, a constitution in which the coil 154A and the substrate 154B are arranged and stacked in the thickness direction of the back-surface wall portion 82 is illustrated, the positions thereof are not particularly limited thereto, another aspect may be adopted.

Figure 23A:
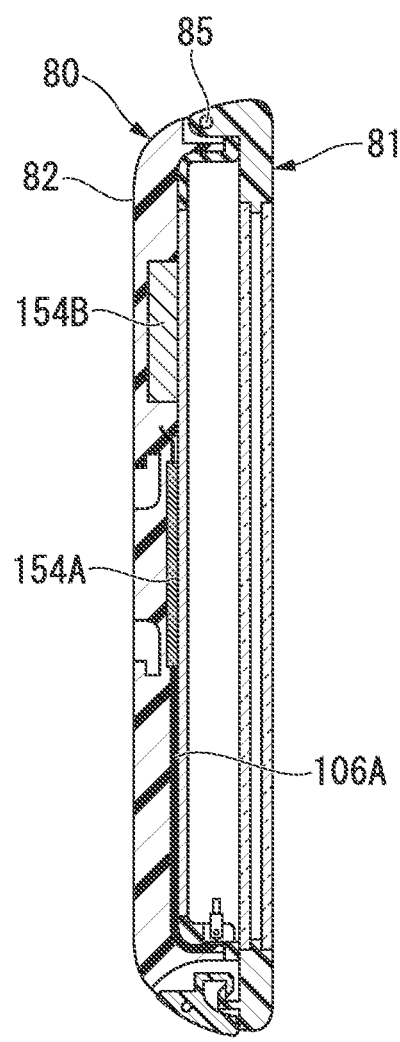
FIG. 23A is a cross-sectional view showing the personal digital assistance case in which configuration of a coil and a substrate is changed in the modified example 5 of the invention.

For example, as shown in FIGS. 23A and 23B, the substrate 154B may be displaced from the coil 154A in the direction parallel to the surface of the back-surface wall portion 82 (offset).

Moreover, the substrate 154B is displaced toward the hinge shaft 85 in FIGS. 23A and 23B, and the substrate 154B may be displaced toward the opposite side thereof.

Next, a modified example 6 of the aforementioned embodiment will be described with reference to FIG. 24.

The configuration of the personal digital assistance case C of the modified example 6 is different from that of the above-described embodiment.

Additionally, the configuration that excludes this points is the same as that of the above-described embodiment.

Figure 24:
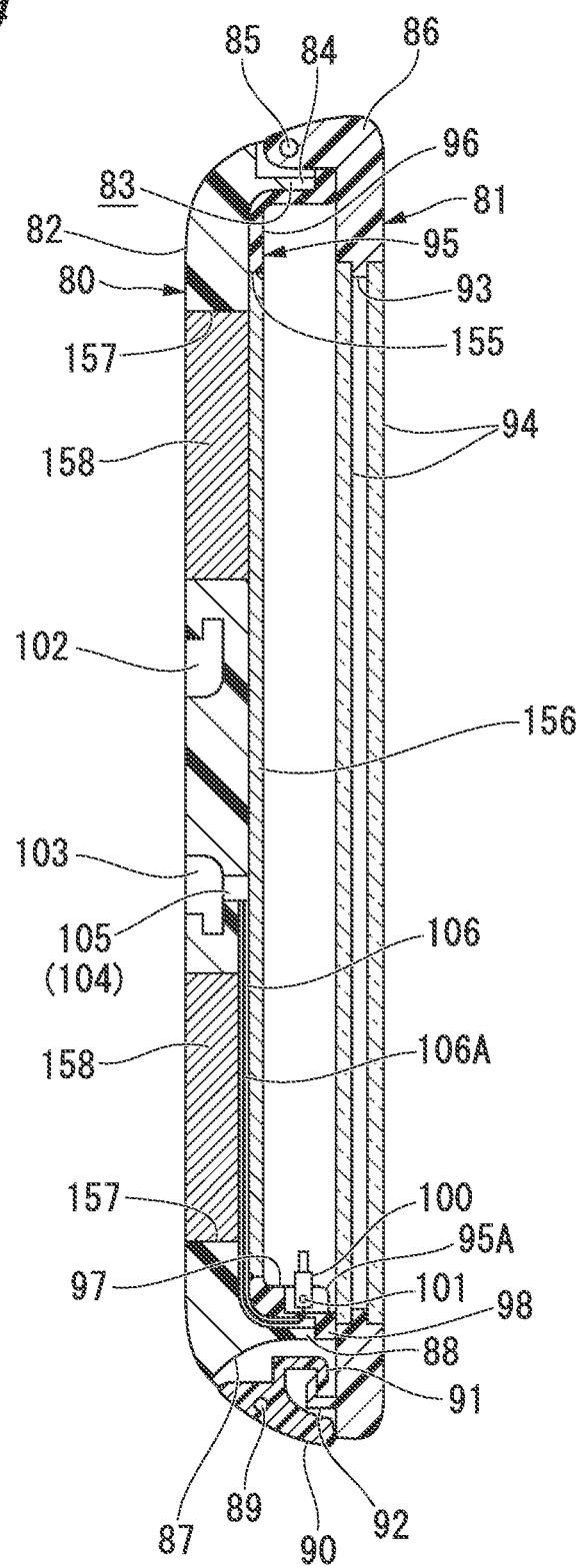
FIG. 24 is a view illustrating a modified example 6 of the embodiment of the invention and is a cross-sectional view showing the personal digital assistance case.

As shown in FIG. 24, in the modified example 6, for example, a rectangular opening 155 is formed at the back-surface contact wall portion 96 of the spacer 95, and the opening 155 allows the inner surface of the back-surface wall portion 82 of the case main body 80 to expose a housing space of the case main body 80.

A heat conductive sheet 156 having substantially the same shape as that of the opening is provided inside the opening 155, and the heat conductive sheet 156 is configured to come into contact with the back surface of the personal digital assistance P when the personal digital assistance P is accommodated.

The heat conductive sheet 156 is made of, for example, a material containing silicone or the like.

On the other hand, for example, a pair of rectangle-shaped openings 157 is formed at both sides of the back-surface wall portion 82 of the case main body 80 so as to sandwich the region on which the first locking hole 102 and the second locking hole 103 are provided.

The openings 157 communicates the housing space of the case main body 80 to the outside thereof.

Furthermore, heat radiation members 158 are provided at such openings 157.

Additionally, such radiation members 158 are in contact with the heat conductive sheet 156 at the surface at which they are located in the housing space of the case main body 80 and are configured so that the outer surface of the case main body 80 are on the same plane as that of the outer surface of the back-surface wall portion 82.

Particularly, as a material used to form the heat radiation members 158, it is preferable to use a material providing excellent radiation performance such as aluminum alloy.

In the modified example 6 described above, since heat of the personal digital assistance P that is accommodated in the case main body 80 can be discharged to the outside thereof through the heat conductive sheet 156 and the heat radiation members 158, the above-described configuration can be particularly and effectively used under a relatively high temperature condition such as a saddle-ride vehicle or the like.

Moreover, the case where the spacer 95 is provided is illustrated, it is not necessary to provide the spacer 95.

In this case, the heat radiation members 158 are provided inside the openings 157 so that the surfaces of the heat radiation members 158 which form the housing space come into contact with the back surface of the personal digital assistance P when the personal digital assistance P is accommodated.

Figure 25A:
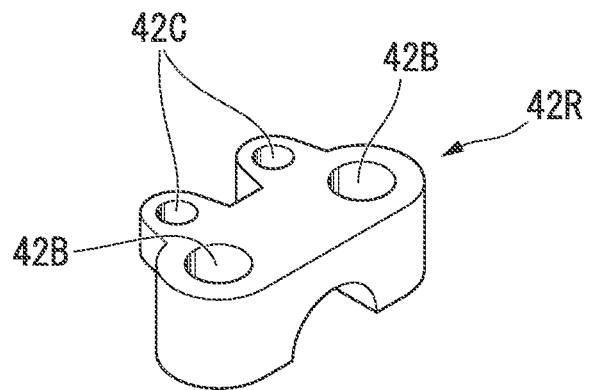
FIG. 25A is a view illustrating a modified example 7 of the embodiment of the invention and is a perspective view showing a steering handlebar holder.
Figure 25B:
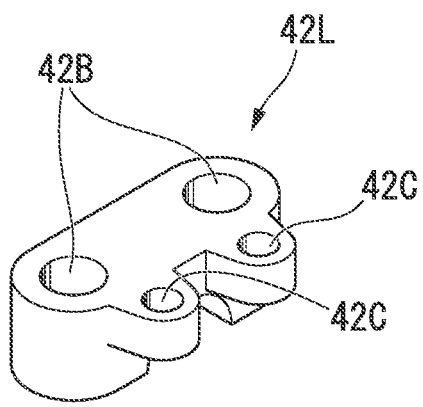
FIG. 25B is a view illustrating the modified example 7 of the embodiment of the invention and is a perspective view showing the steering handlebar holder.

Next, FIGS. 25A and 25B are views showing a modified example 7.

In the modified example, bolt fastener holes 42C different from the through holes 42B are formed at the positions located at the outside of the through holes 42B of the upper holder 42.

Therefore, the base 55A of the portable terminal holder 55 is coupled to the upper holder 41 through the bolt fastener holes 42C.

As mentioned above, the embodiment of the invention is illustrated; however, the technical scope of the invention is not limited to the above embodiments, and various modifications such as the above-described Examples may be made without departing from the scope of the invention.

Particularly, in the aforementioned embodiment, the example that the plus charging terminal 56 and the minus charging terminal 57 are provided at the second locking portion 64 is illustrated.

Not only this embodiment but also an aspect that the plus charging terminal 56 and the minus charging terminal 57 are provided on the first locking portion 63 is adopted as a modified example.

Also, an aspect that the plus charging terminal 56 and the minus charging terminal 57 are provided to the first locking portion 63 and the second locking portion 64, respectively, is adopted.

Additionally, in the above-mentioned embodiment, the structure in which two transparent plate members 94 are provided at the window 93 of the lid member 81 is described; however, single transparent plate member 94 is provided thereat and a countermeasure against fogging may be provided to the transparent plate member 94 by forming an antifog member on the transparent plate member 94.

In particular, as an antifog member, for example, a solvent medium or the like including a surface active agent may be used.

Furthermore, an electroconductive material is used as a material of the transparent plate member 94 and a touch panel may be used.

Moreover, in the above-described embodiment shown in FIG. 8, the example is described that the voltage converter 70 is disposed on the top surface of the rear-half portion 47 of the steering handlebar cover 48, and between the right and left lower holders 41L and 41R when seen in the axial direction of the steering axis line L1 so that the part thereof is located behind the line connecting the front ends of the right and left lower holders 41L and 41R.

The voltage converter 70 may be disposed in front of the steering handlebar cover 48.

In this case, when an electric cord that connects the battery B and the voltage converter 70 is provided in front of the steering shaft, it is possible to shorten the electric cord, the electric cord can be easily prevented from being pulled due to steering and from swinging, and it is possible to improve protection performance of the electric cord.

Furthermore, in the aforementioned embodiment shown in FIG. 8, the example is illustrated that the power supply that is constituted of the plus charging terminal 56 and the minus charging terminal 57 is provided at the portion 64A located in the direction in which the L-shaped bend portion of the second locking portion 64 is placed upright, i.e., at the portion 64A facing the personal digital assistance P.

The power supply may be provided at the end of the second locking portion 64 and at the surface facing the base 62 as indicated by β shown in this drawing.

In this case, the plus charging terminal 56 and the minus charging terminal 57 is in a state of not being exposed to the outside thereof as much as possible, and waterproofness and protection performance of the plus charging terminal 56 and the minus charging terminal 57 can be reliably obtained even before the state of pre-insertion of the locking hole.

In addition, in this case, the plus contact point 104 and the minus contact point 105 in the locking holes of the personal digital assistance case C are positionally provided on the surface thereof facing the personal digital assistance P in the locking holes.

Furthermore, the personal digital assistance P of the aforementioned embodiment includes various information terminals a tablet device, navigation device, or the like as well as so-called smartphone, which can receive electrical power supply.

DESCRIPTION OF REFERENCE NUMERAL 6 front wheel
7 front fork
9 steering shaft (steering axis)
10 steering handlebar pipe
11 vehicle body frame
40 steering handlebar holder
41 lower holder
42 upper holder
55 portable terminal holder
55A base
59 first shaft portion (shaft portion)
63 first locking portion (locking portion)
64 second locking portion (locking portion)
B battery
S steering system

The invention claimed is:

1. A saddle-ride vehicle comprising:
a front fork that rotatably supports a front wheel;
a steering shaft that is coupled to the front fork and is steerably supported by a vehicle body frame;
a steering handlebar holder that comprises a lower holder and an upper holder and is provided above the steering shaft, the upper holder being in contact with the lower holder from above and fastened to the lower holder;
a portable terminal holder fastened to the upper holder or the lower holder, the portable terminal holder including a first base and a locking portion, the locking portion being provided upright on the first base, the locking portion being capable of holding a personal digital assistance;
a connection line electrically connected to a battery, the battery supplying electric power to the connection line, the connection line being attached to the first base or the locking portion; and
a steering system in which a steering handlebar pipe sandwiched between the lower holder and the upper holder is fixed to the steering handlebar holder.

2. The saddle-ride vehicle according to claim 1, wherein the portable terminal holder is fastened to the lower holder and the upper holder, and the upper holder and the portable terminal holder are tightened together to the lower holder.

3. The saddle-ride vehicle according to claim 1, wherein the portable terminal holder holds the personal digital assistance so that the personal digital assistance is located on an extension line of a steering axis line of the steering shaft.

4. The saddle-ride vehicle according to claim 1, further comprising:
an instrument panel disposed in front of the steering handlebar pipe, wherein
the personal digital assistance is held by the portable terminal holder;
in a case where a driver seated on a seat looks at the instrument panel along a line of sight in which the driver looks at an upper end of the personal digital assistance, the portable terminal holder holds the personal digital assistance so that a substantially lower edge of the instrument panel is located in the line of sight.

5. The saddle-ride vehicle according to claim 4, wherein in a case where the personal digital assistance is held by the portable terminal holder,
where an angle between a line of sight when the driver looks at an upper end of the instrument panel and a line of sight when the driver looks at the upper end of the personal digital assistance is represented as a first view angle ($\theta1$); and an angle between the line of sight when the driver looks at the upper end of the personal digital assistance and a line of sight when the driver looks at a lower end of the personal digital assistance is represented as a second view angle ($\theta2$), a relationship of the first view angle ($\theta1$)+the second view angle ($\theta2$)<90 degrees is established, where an angle between a straight line that extends forward and upward in a direction parallel to a surface of a display unit of the instrument panel and the line of sight when the driver looks at an upper end of the instrument panel is represented as a first eye point angle; and an angle between a straight line that extends forward and upward in a direction parallel to a surface of the personal digital assistance and the line of sight when the driver looks at the upper end of the personal digital assistance is represented as a second eye point angle ($\theta\beta$), a relationship of 90 degrees≤the first eye point angle ($\theta\alpha$) ≤180 degrees and a relationship of 90 degrees≤the second eye point angle ($\theta\beta$)≤180 degrees is established.

6. The saddle-ride vehicle according to claim 4, wherein where an angle between a horizontal line of sight when the driver looks forward and upward along a horizontal direction parallel to a ground surface and a straight line that extends forward and upward in a direction parallel to a surface of a display unit of the instrument panel is represented as a panel inclination angle ($\theta\alpha'$); an angle between the horizontal line of sight when the driver looks forward and upward along the horizontal direction parallel to the ground surface and a straight line that extends forward and upward in a direction parallel to a surface of the personal digital assistance is represented as a terminal inclination angle ($\theta\beta'$), a relationship of the panel inclination angle ($\theta\alpha'$)>the terminal inclination angle ($\theta\beta'$) is established.

7. The saddle-ride vehicle according to claim 1, wherein the portable terminal holder is placed above the upper holder and is configured to include: a second base that is fastened to the lower holder, the locking portion protrudes from the second base and the upper holder is covered with the second base.

8. The saddle-ride vehicle according to claim 7, wherein the second base is formed in a downward-and-backward inclined shape.

9. The saddle-ride vehicle according to claim 8, wherein the portable terminal holder comprises a shaft portion parallel to an extension direction of the steering handlebar pipe that is sandwiched by the steering handlebar holder and is capable of allowing the locking portion to rotate around the shaft portion, and the shaft portion is placed behind the steering handlebar pipe.

10. The saddle-ride vehicle according to claim 2, wherein the portable terminal holder holds the personal digital assistance so that the personal digital assistance is located on an extension line of a steering axis line of the steering shaft.

11. The saddle-ride vehicle according to claim 5, wherein where an angle between a horizontal line of sight when the driver looks forward and upward along a horizontal direction parallel to a ground surface and a straight line that extends forward and upward in a direction parallel to a surface of a display unit of the instrument panel is represented as a panel inclination angle ($\theta\alpha'$); an angle between the horizontal line of sight when the driver looks forward and upward along the horizontal direction parallel to the ground surface and a straight line that extends forward and upward in a direction parallel to a surface of the personal digital assistance is represented as a terminal inclination angle ($\theta\beta'$), a relationship of the panel inclination angle ($\theta\alpha'$)>the terminal inclination angle ($\theta\beta'$) is established.

12. The saddle-ride vehicle according to claim 1, wherein the locking portion is provided with a power supply, and the power supply is electrically connected to the connection line.

13. The saddle-ride vehicle according to claim 1, wherein the first base is provided with a power supply, and the power supply is electrically connected to the connection line.

14. The saddle-ride vehicle according to claim 13, wherein the portable terminal holder is provided with a spring provided between the first base and the power supply.

* * * * *